(12) United States Patent
Fujiwara et al.

(10) Patent No.: US 8,534,705 B2
(45) Date of Patent: Sep. 17, 2013

(54) STEERING COLUMN SUPPORT APPARATUS

(75) Inventors: Takeshi Fujiwara, Gunma (JP); Kiyoshi Sadakata, Gunma (JP); Toru Segawa, Gunma (JP); Takahiro Minamigata, Gunma (JP)

(73) Assignee: NSK Ltd., Tokyo (JP)

( * ) Notice: Subject to any disclaimer, the term of this patent is extended or adjusted under 35 U.S.C. 154(b) by 0 days.

(21) Appl. No.: 13/386,658

(22) PCT Filed: Nov. 9, 2011

(86) PCT No.: PCT/JP2011/075847
§ 371 (c)(1),
(2), (4) Date: Mar. 16, 2012

(87) PCT Pub. No.: WO2012/086331
PCT Pub. Date: Jun. 28, 2012

(65) Prior Publication Data
US 2012/0267884 A1 Oct. 25, 2012

(30) Foreign Application Priority Data

Dec. 21, 2010 (JP) ................................. 2010-283971
Dec. 28, 2010 (JP) ................................. 2010-293157
Sep. 20, 2011 (JP) ................................. 2011-204214

(51) Int. Cl.
*B62D 1/19* (2006.01)
(52) U.S. Cl.
USPC .............................. 280/777; 74/493; 280/775
(58) Field of Classification Search
USPC ................... 74/493; 180/271, 274; 280/775, 280/777

IPC ......................................................... B62D 1/19
See application file for complete search history.

(56) References Cited

U.S. PATENT DOCUMENTS

| 4,943,028 A | * | 7/1990 | Hoffmann et al. | ............. | 248/548 |
| 5,056,818 A | * | 10/1991 | Sadakata | ....................... | 280/777 |

(Continued)

FOREIGN PATENT DOCUMENTS

| GB | 2411156 A | * | 8/2005 |
| JP | 51-121929 U | | 8/1975 |

(Continued)

*Primary Examiner* — Joseph Rocca
*Assistant Examiner* — Laura Freedman
(74) *Attorney, Agent, or Firm* — Miles & Stockbridge P.C.

(57) ABSTRACT

Construction of a steering column support apparatus is achieved that simplifies tuning for stabilizing forward displacement of a steering wheel during a secondary collision, lowers and stabilizes the break away load, and when necessary, prevents the steering wheel from dropping excessively after a secondary collision. A locking cutout section 27 that extends in the forward/backward direction is formed in a bracket 11*a* on the vehicle side, top and bottom sliding plate sections 31*a*, 31*b* that are formed on outside and inside sliding plates 51, 52 of a sliding member 28 are located on both the top and bottom surfaces of the portions on both sides of the locking cutout section 27. A bolt that is inserted from the top through these sliding plate sections 31*a*, 31*b* and a nut 30 connect the top plate section 23 of a bracket 12*b* on the column side to the bracket 11*a* on the vehicle side. During a secondary collision, the outside sliding plate 51 slides and moves in the forward direction with respect to the inside sliding plate 52, and the bracket 12*b* on the column side breaks away from the bracket 11*a* on the vehicle side with little force.

13 Claims, 44 Drawing Sheets

(56) References Cited

U.S. PATENT DOCUMENTS

| | | | | |
|---|---|---|---|---|
| 5,356,179 A * | 10/1994 | Hildebrandt et al. | | 280/777 |
| 5,390,955 A * | 2/1995 | Kaliszewski et al. | | 280/777 |
| 5,425,553 A * | 6/1995 | Yazane et al. | | 280/777 |
| 5,609,364 A * | 3/1997 | Fouquet et al. | | 280/777 |
| 5,775,172 A * | 7/1998 | Fevre et al. | | 74/492 |
| 6,062,100 A * | 5/2000 | Sarsfield et al. | | 74/492 |
| 6,378,903 B1 * | 4/2002 | Yabutsuka et al. | | 280/777 |
| 7,300,071 B2 * | 11/2007 | Lee | | 280/777 |
| 7,472,924 B2 * | 1/2009 | Ikegaya et al. | | 280/777 |
| 8,382,156 B2 * | 2/2013 | Akutsu et al. | | 280/777 |
| 2011/0227322 A1 * | 9/2011 | Nakamura et al. | | 280/777 |
| 2012/0112443 A1 * | 5/2012 | Arakawa et al. | | 280/777 |
| 2012/0144951 A1 * | 6/2012 | Minamigata et al. | | 74/492 |
| 2012/0169035 A1 * | 7/2012 | Minamigata et al. | | 280/777 |
| 2012/0186384 A1 * | 7/2012 | Minamigata et al. | | 74/492 |
| 2012/0187669 A1 * | 7/2012 | Minamigata et al. | | 280/777 |
| 2012/0234623 A1 * | 9/2012 | Akutsu et al. | | 180/443 |
| 2012/0240711 A1 * | 9/2012 | Minamigata et al. | | 74/493 |
| 2012/0273291 A1 * | 11/2012 | Akutsu et al. | | 180/443 |
| 2012/0299281 A1 * | 11/2012 | Fujiwara et al. | | 280/777 |

FOREIGN PATENT DOCUMENTS

| | | |
|---|---|---|
| JP | 56-25981 Y2 | 6/1981 |
| JP | 60-169365 A | 9/1985 |
| JP | 2000-006821 A | 1/2000 |
| JP | 2005-219641 A | 8/2005 |

* cited by examiner

Fig. 40
(A)
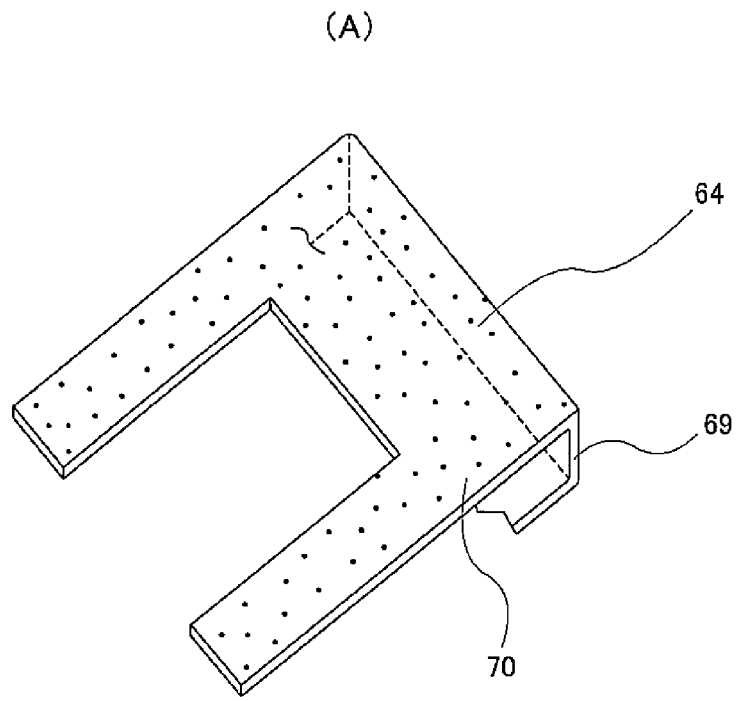
(B)
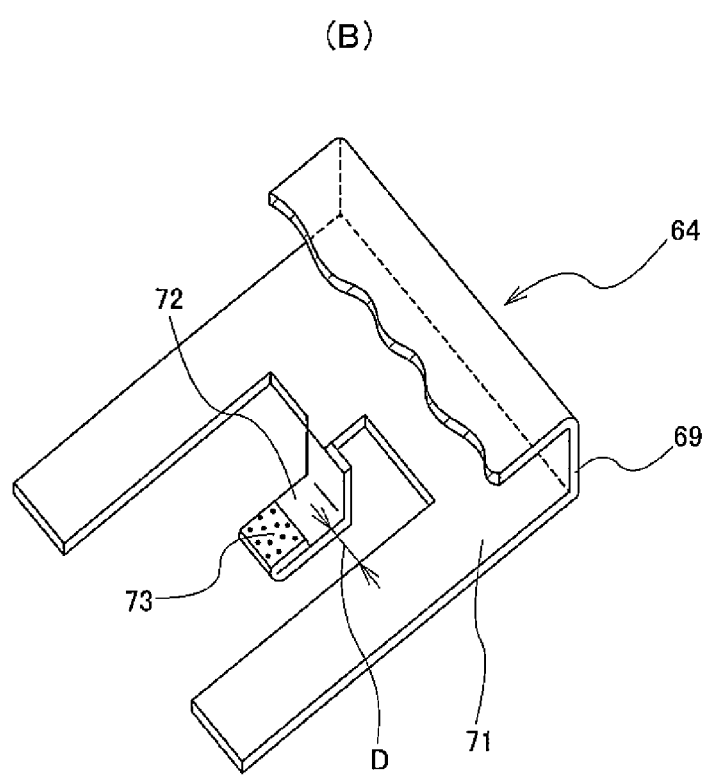

Fig. 46        PRIOR ART

STEERING COLUMN SUPPORT APPARATUS

FIELD OF THE INVENTION

The present invention relates to a steering column support apparatus that supports a steering column such that the steering column can displace in the forward direction with respect to the vehicle body in order to enable the steering wheel to displace in the forward direction while absorbing impact energy that is applied to the steering wheel from the body of the driver during an impact collision.

BACKGROUND ART

A steering apparatus for an automobile, as illustrated in FIG. 41, is constructed so that rotation of the steering wheel 1 is transmitted to an input shaft 3 of a steering gear unit 2, and as this input shaft 3 turns, the input shaft 3 pushes or pulls a pair of left and right tie rods 4, which apply a steering angle to the front wheels of the automobile. The steering wheel 1 is fastened to and supported by the rear end section of a steering shaft 5, and this steering shaft 5 is inserted in the axial direction through a cylindrical shaped steering column 6, and is supported by this steering column 6 such that it can rotate freely. The front end section of the steering shaft 5 is connected to the rear end section of an intermediate shaft 8 via a universal joint 7, and the front end section of this intermediate shaft 8 is connected to the input shaft 3 via a different universal joint 9. The intermediate shaft 8 is constructed so that it can transmit the torque and it can contract over its entire length due to an impact load. Therefore, when the steering gear unit 2 is displaced in the backward direction due to a primary collision between an automobile and another automobile or the like, that displacement is absorbed, which prevents the steering wheel 1 from displacing in the backward direction via the steering shaft 5 and hitting the body of the driver.

In such a steering apparatus for an automobile, for providing additional protection of the driver, it is necessary to adopt a structure that allows the steering wheel 1 to displace forward while absorbing impact energy when an accident occurs. After the primary collision, a secondary collision occurs when the body of the driver collides with the steering wheel 1. As this kind of construction, construction is known (refer to JP51-121929(U), JP2005-219641(A) and JP2000-6821(A)) and widely used in which an energy absorbing member, which absorbs an impact load by plastically deforming, is provided between the vehicle body and a member that supports the steering column 6 that supports the steering wheel 1 with respect to the vehicle body so that it can break away in the forward direction due to an impact load in the forward direction during a secondary collision, and displaces in the forward direction together with the steering column 6.

FIG. 42 to FIG. 44 illustrate an example of this kind of steering apparatus. A housing 10, which houses the reduction gear and the like of an electric power steering apparatus, is fastened to the front end section of a steering column 6a. A steering shaft 5a is supported on the inside of the steering column 6a such that it can only rotate freely, and a steering wheel 1 (see FIG. 41) can be fastened to the portion on the rear end section of this steering shaft 5a that protrudes from the opening on the rear end of the steering column 6a. The steering column 6a and the housing 10 are supported by a bracket on the vehicle side (not shown) having a flat shape that is fastened to the vehicle body so that they can break away in the forward direction due to an impact load in the forward direction.

To accomplish this, a bracket 12 on the column side that is supported in the middle section of the steering column 6a and a bracket 13 on the housing side that is supported by the housing 10 are supported with respect to the vehicle body so that they both can break away in the forward direction due to an impact load in the forward direction. These brackets 12, 13 both comprise installation plate sections 14a, 14b at one or two locations, and notch sections 15a, 15b are formed in these installation plate sections 14a, 14b so that they are open on the rear end edges. With these notch sections 15a, 15b covered, sliding plates 16a, 16b are assembled in the portions of these brackets 12, 13 near both the left and right ends.

These sliding plates 16a, 16b are formed by bending thin metal plate such as carbon steel plate or stainless steel plate provided with a layer of a synthetic resin that slides easily, such as polyamide resin (nylon), polytetrafluoroethylene resin (PTFE) or the like on the surface into a U shape, having a top plate section and a bottom plate section that are connected by a connecting plate section. Through holes for inserting bolts or studs are formed in portions of the top and bottom plate sections that are aligned with each other. With these sliding plates 16a, 16b mounted on the installation plate sections 14a, 14b, the through holes are aligned with the notch sections 15a, 15b that are formed in these installation plate sections 14a, 14b.

The brackets 12 on the column side and the bracket 13 on the housing side are supported by the bracket 11 on the vehicle side by screwing nuts onto bolts or studs that are inserted through the notch sections 15a, 15b in the installation plate sections 14a, 14b and the through holes in the sliding plates 16a, 16b, and tightening the nuts. During a secondary collision, the bolts or studs come out from the notch sections 15a, 15b together with the sliding plates 16a, 16b, which allows the steering column 6a and the housing 10 to displace in the forward direction together with the bracket 12 on the column side, the bracket 13 on the housing side and the steering wheel 1.

Moreover, in the example in the figure, energy absorbing members 17 are provided between the bolts or studs and the bracket 12 on the column side. As this bracket 12 on the column side displaces in the forward direction, the energy absorbing members 17 plastically deform so as to absorb the impact energy that is transmitted to the bracket 12 on the column side by way of the steering shaft 5a and steering column 6a.

During a secondary collision, the bolts or studs, which was in a normal state shown in FIG. 43, come out from the notch sections 15a as shown in FIG. 44, which allows the bracket 12 on the column side to displace in the forward direction, and the steering column 6a displaces in the forward direction together with this bracket 12 on the column side. When this happens, the bracket 13 on the housing side also breaks away from the vehicle body, and is allowed to displace in the forward direction. As the bracket 12 on the column side displaces in the forward direction, the energy absorbing members 17 plastically deform and absorb the impact energy that is transmitted from the driver's body to the bracket 12 on the column side by way of the steering shaft 5a and the steering column 6a, which lessens the impact applied to the body of the driver.

In the case of the construction illustrated in FIG. 42 to FIG. 44, the bracket 12 on the column side is supported by the bracket 11 on the vehicle side at two locations, on both the right and left side, so that it can break away in the forward direction during a secondary collision. From the aspect of stable displacement in the forward direction without causing the steering wheel 1 to tilt, it is important during a secondary collision, that the pair of left and right support sections be disengaged at the same time. However, tuning in order that these support sections disengage at the same time is affected not only by resistance such as the friction resistance and the shear resistance to the disengagement of these support sections, but unbalance on the left and right of the inertial mass of the portion that displaces in the forward direction together with the steering column 6a, so takes time and trouble.

In order to stabilize the breaking away of the steering column in the forward direction during a secondary collision, applying the construction disclosed in JP51-121929(U) can be somewhat effective. FIG. 45 to FIG. 47 illustrate the construction disclosed in JP51-121929(U). In the case of this construction, a locking notch 18 is formed in the center section in the width direction of a bracket 11 on the vehicle side that is fastened to and supported by the vehicle body and that does not displace in the forward direction even during a secondary collision, and this locking notch 18 is open on the front end edge of the bracket 11 on the vehicle side. Moreover, a bracket 12a on the column side is supported by and fixed to the steering column 6a side such that it is able to displace in the forward direction together with a steering column 6b during a secondary collision.

Furthermore, both the left and right end sections of a locking capsule 19 that is fastened to this bracket 12a on the column side is locked in the locking notch 18. In other words, locking grooves 20 that are formed on both the left and right side surfaces of the locking capsule 19 engage with the edges on the both the left and right sides of the locking notch 18. Therefore, the portions on both the left and right end sections of the locking capsule 19 that exist on the top side of the locking grooves 20 are positioned on the top side of the bracket 11 on the vehicle side on both side sections of the locking notch 18. When the bracket 11 on the vehicle side and the locking capsule 19 are engaged by way of the locking grooves 20 and the edges on both sides of the locking notch 18, locking pins 22 are pressure fitted into small locking holes 21a, 21b that are formed in positions in these members 11, 19 that are aligned with each other, joining the members 11, 19 together. These locking pins 22 are made using a relatively soft material such as an aluminum alloy, synthetic resin or the like that will shear under an impact load that is applied during a secondary collision.

When an impact load is applied during a secondary collision from the steering column 6b to the locking capsule 19 by way of the bracket 12a on the column side, these locking pins 22 shear. The locking capsule 19 then comes out in the forward direction from the locking notch 18, which allows the steering column 6b to displace in the forward direction together with the steering wheel 1 which is supported by this steering columns 6b by way of the steering shaft 5.

In the case of the construction illustrated in FIG. 45 to FIG. 47, the engagement section between the locking capsule 19 that is fastened to the bracket 12a on the column side and the bracket 11 on the vehicle side is located at only one location in the center section in the width direction. Therefore, tuning for disengaging this engagement section and causing the steering wheel 1 to displace stably in the forward direction during a secondary collision becomes easy. Although this construction is effective from the aspect of allowing the steering column 6b to break away in the forward direction during a secondary collision with postural stability, in this construction, in order to more completely protect the driver by suppressing and stabilizing the load required for the disengagement (break away load), it is desired that the following points be improved.

In other words, in order to suppress the impact which is applied to the driver's body during a secondary collision more effectively, it is preferable to suppress the break away load so as to allow the steering column 6a to begin to be displaced in the forward direction at the instant of the secondary collision. In addition to facilitate the smooth displacement of the steering column 6a in the forward direction at the instant of the secondary collision, so as to suppress the impact which is applied to the driver's body who collides against the steering wheel 1, also after the beginning of the displacement of the steering column 6a, by plastically deforming an energy absorbing member 17 attached to the steering column 6a, the impact energy transmitted to the steering wheel 1 is absorbed, such that the protection for the driver can be enhanced.

In the case of the construction illustrated in FIG. 45 to FIG. 47, so as to allow the steering column 6a to begin to be displaced in the forward direction at the instant of the secondary collision, it is necessary to shear a plurality of locking pins. In order to shear these locking pins, a certain amount of the impact load is required, that is disadvantage for suppressing the break away load. On the other hand, in the construction shown in FIG. 42 to FIG. 44, tuning in order to stabilize the attitude of steering column 6a takes time and trouble, and a slight change in tightening torque of a bolt or the like for assembling the bracket 12 on the column side on the vehicle body side causes the break away load to vary widely, complicating the control of the tightening torque. For these reasons, in these conventional constructions, it is difficult to disengage this steering column 6a from the vehicle side in the forward direction with posture stability and decrease and stabilize the break away load.

RELATED ART LITERATURE

Patent Literature

[Patent Literature 1] JP51-121929(U)
[Patent Literature 2] JP2005-219641(A)
[Patent Literature 3] JP2000-6821(A)
[Patent Literature 4] JP56-25981(U)
[Patent Literature 5] JPS60-169365(A)

SUMMARY OF THE INVENTION

In consideration of the problems above, the object of the present invention is to provide construction of a steering column support apparatus that is capable of simplifying tuning for stabilizing forward displacement in the forward direction of the steering wheel during a secondary collision, lower and stabilizing the break away load, and when necessary, preventing the steering wheel from dropping excessively after a secondary collision.

A steering column support apparatus according to a first aspect of the present invention, comprises:

a bracket on the vehicle side that is made using metal plate, is fastened to the vehicle body in at least two locations on both sides in the width direction, does not displace in the forward direction during a secondary collision, and has a locking cutout section that extends in the forward/backward direction that is formed in between the two locations on both sides;

a bracket on the column side that is made using metal plate, is located under the bracket on the vehicle side, supports the steering column, and has a top plate section in the top end section that has a width dimension that is greater than the width dimension of the locking cutout section;

a sliding member having a pair of top and bottom sliding plate sections each having a width dimension that is greater than the width dimension of the locking cutout section and arranged such that both end sections in the width direction of these sliding plate sections hold from both the top and bottom sides portions of the bracket on the vehicle side that are located on both sides of the locking cutout section; and a fastening member that is inserted in the up/down direction through the sliding member and has a restraining portion on the top end side, the sliding member and the fastening member being located on the rear end section of the locking cutout section, and by holding the portions of the bracket on the vehicle side between the restraining portion and the top plate section by way of the pair of sliding plate sections, the bracket on the column side being supported by the bracket on the vehicle side so as to be able to break away in the forward direction due to an impact load that is applied during a secondary collision.

The pair of sliding plate sections can be independent of each other, or can be connected and integrated into a single member by a connecting section having a width dimension that is less than the width dimension of the locking cutout section.

Moreover, the sliding member can comprise:

an inside sliding member having a pair of sliding plate sections that is connected by a connecting section having a width dimension that is less than the width dimension of the locking cutout section, and through holes in the center sections of the sliding plate sections for the fastening member to pass through; and an outside sliding member having a pair of sliding plate sections that is connected by a connecting section having a width dimension that is less than the width dimension of the locking cutout section, and notch sections that are open in the center section in the width direction of front end edges of the sliding plate sections for the fastening member to pass through.

Various shapes can be employed for the locking cutout section. For example, the locking cutout section can be composed of two though holes or two notches that are parallel with each other and that extend in the forward/backward direction. In that case, the sliding member and the fastening member are located in the rear end section of each of these through holes or notches.

Alternatively, the locking cutout section can be composed of a though hole comprising a wide section located in the front half section and two notch shaped extending sections located in the rear half section that are parallel to each other and extend in the forward/backward direction further toward the rear from two location on both end sections in the width direction of the end on the rear end of the wide section. And the sliding member and the fastening member are located in the rear end section of each of these extending sections.

In construction such as this wherein the locking cutout section comprises two rear end sections, the sliding members that are placed in these rear end sections can be integrated into one member by connecting them together in the width direction by a joining section.

Alternatively, in construction wherein the locking cutout section comprises two rear end sections, a reinforcing plate that spans between the two sliding members that are located in the two rear end sections can be provided on top of these sliding members, and the restraining portion of the fastening member can press the top surface of this reinforcing plate downward toward the bracket on the vehicle side.

Furthermore, the locking cutout section can be one through hole or notch that extends in the forward/backward direction. In this case, the through hole or notch is formed in the center section between the two locations on both sides in the width direction. The sliding member and the fastening member are located in the rear end section of this through hole or notch.

In addition, in construction wherein the locking cutout section is composed of one or two parallel notches that are open on the front end edge of the bracket on the vehicle side and that extend in the forward/backward direction, or is composed of a though hole comprising a wide section located in the front half section and two notch shaped extending sections located in the rear half section that are parallel to each other and extend in the forward/backward direction further toward the rear from two location on both end sections in the width direction of the end on the rear end of the wide section, construction is possible wherein a bent section on the bottom side that is formed by bending a portion of the bracket on the vehicle side that faces a rear end edge section of the top plate section of the bracket on the column side downward and toward the front such as to have a U shaped cross section, and this bent section on the bottom side wraps around and holds the rear end edge section of the top plate section; and a bent section on the top side that is formed by bending a protruding plate section, which comprises a base section that extends in the forward direction from a front end edge section of the top plate section and has a width dimension that is less than the width dimension of the notch, and a restraining plate section that is located on the tip end section of the base section and that has a width dimension that is greater than the width dimension of the notch, upward and toward the rear such as to have a U-shaped cross section, and this bent section on the top side restrains the portions of the bracket on the vehicle side on both sides of the locking notch or the through hole.

Moreover, a spacer having a thickness dimension that is equal to or greater than the thickness dimension of the metal plate of the bracket on the vehicle side can be placed inside the locking cutout section and held between the pair of top and bottom sliding plate sections.

The steering column support apparatus according to a second aspect of the present invention comprises:

a bracket on the vehicle side that is made using metal plate, is fastened to a vehicle body in at least two locations on both sides in the width direction, does not displace in the forward direction during a secondary collision, and has a locking cutout section that extends in the forward/backward direction that is formed in between the two locations on both sides; and a bracket on the column side that is made using metal plate, is located under the bracket on the vehicle side, supports the steering column, and has a top plate section in the top end section that has a width dimension that is greater than the width dimension of the locking cutout section.

In the steering column support apparatus according to this second aspect, the bracket on the column side is supported by the bracket on the vehicle side so as to be able to break away in the forward direction due to an impact load that is applied during a secondary collision by:

(1) comprising a pressure plate section on the bottom side that is formed in at least the center section in the width direction of the rear end edge of the locking cutout section of the bracket on the vehicle side by bending a tip end edge thereof downward and toward the front, and pushing the bottom surface of the center section in the width direction of the top plate section of the bracket on the column side upward by this pressure plate section on the bottom side such that the top surface of the top plate section is pressed against the bottom surface of the bracket on the vehicle side; and/or (2) comprising a pressure plate section on the top side that is formed in the center section in the width direction of a portion of the top plate section other than the front section by bending the tip end edge thereof upward and toward the rear, and pushing the top surface of the center section in the width direction of the bracket on the vehicle side downward by this pressure plate section on the top side such that the bottom surface of the bracket on the vehicle side is pressed against the top surface of the top plate section; and (3) providing a restraining plate on the top surface of the bracket on the vehicle side that spans between the portions on both the left and right sides of the locking cutout section, and holding the portions of the bracket on the vehicle side that are located on both the left and right sides of the locking cutout section between the restraining plate and the top plate section by connecting the restraining plate section and the top plate section with a fastening member.

In this case, preferably, a sliding layer made of a low-friction material is located between both the top and bottom surface of the bracket on the vehicle side and the surfaces of the members that come in contact with these top and bottom surfaces before the occurrence of a secondary collision.

More specifically, a sliding plate, which is formed by bending a thin metal plate covered on one side with coating layer made of a low-friction material such that the coating layer is on at least the top surface of the sliding plate section on the top side and the bottom surface of the sliding plate section on the bottom side, and with a bent back section formed with a portion of the sliding plate section on the bottom side that is above the pressure plate on the bottom side tightly bent at 180 degrees such that the surface that is not covered with the coating layer is on the inside, is used as a sliding member provided with the sliding layer. The coating layer on the top surface of the sliding plate section on the top side comes in contact with the bottom surfaces of both the left and right ends of the restraining plate and the bottom surface of the pressure plate section on the top side, the coating layer on the bottom surface of the sliding plate section on the bottom side comes in contact with the top surface of the top plate section of the bracket on the column side, and the coating layer on both surfaces of the bent back section comes in contact with the bottom surface of the bracket on the column side and the top surface of the pressure plate section on the bottom side.

In the steering column support apparatus of either of the aspects, the length in the forward/backward direction of the locking cutout section is longer than the length in the forward/backward direction of the bracket on the column side and is long enough so that even when the restraining plate, together with the steering column and the bracket on the column side, has displaced all the way possible in the forward direction during a secondary collision, at least part of that restraining plate is located on the top side of the front end section of the bracket on the vehicle side, preventing the restraining plate from dropping down.

Preferably, an energy absorbing member, which absorbs an impact load by plastically deforming, is provided between the steering column or a portion that displaces in the forward direction together with the steering column and the bracket on the vehicle side or a portion that is supported by the vehicle body or the vehicle side.

EFFECT OF THE INVENTION

With the steering column support apparatus of the present invention, construction is achieved in which it is possible to simplify tuning for stabilizing the forward displacement of the steering wheel during a secondary collision, lower and stabilize the break away load, and when necessary, prevent the steering wheel from dropping excessively during a secondary collision.

Simplifying the tuning for stabilizing the forward displacement of the steering wheel during a secondary collision is made possible by engaging the bracket on the vehicle side and bracket on the column side in the portion between two locations on both sides where the bracket on the vehicle side is fastened to the vehicle side. Through engagement in the portion between these two locations in the width direction (middle section in the width direction), impact that is applied to the bracket on the column side during a secondary collision is applied nearly uniformly at the engagement section between the bracket on the vehicle side and the bracket on the column side, and because it becomes difficult for a moment in the bending direction to be applied to the bracket on the column side, it becomes possible to simplify tuning.

Lowering and stabilizing the break away load, in the first aspect of the present invention, is made possible by holding the bracket on the vehicle side and the bracket on the column side between part of a pair of top and bottom sliding plate sections of a sliding member located in part of the bracket on the vehicle side. With the existence of these sliding plate sections, it is possible to keep the friction force acting between both the top and bottom surfaces of the bracket on the vehicle side and the bottom surface of the restraining portion and the top surface of the top plate section of the bracket on the column side. Therefore, it is possible to lower and stabilize the break away load that is determined based on this friction force.

In the second aspect of the present invention, a pressure plate section on the bottom side is provided on the bracket on the vehicle side, a pressure plate section on the top side is provided on the bracket on the column side, and the bracket on the vehicle side and the bracket on the column side are connected by the friction force that occurs when at least one of these pressure plates section pushes the opposing side, and the friction force that occurs by holding the portions on both the left and right sides of the locking cutout section in the bracket on the vehicle side between the top plate section of the bracket on the column side and a restraining plate that is connected to the top plate section by a fastening member. Of these friction forces, the friction force that occurs by holding the portions on both the left and right sides of the locking cutout section between the top plate section and the restraining plate can easily be adjusted by the connecting force of the fastening member (force acting in the axial direction of the fastening member). Therefore, it is possible to lower and stabilize the break away load, which is the total of these friction forces.

Preventing the steering wheel from dropping (falling) excessively during a secondary collision is achieved by making the length in the forward/backward direction of the locking cutout section sufficiently long. With this construction, even when the steering wheel has displaced completely in the forward direction as the secondary collision advanced, it is possible to prevent the restraining portion of the fastening member or bottom surface of the restraining plate from becoming disengaged from the top surface of the front end section of the bracket on the vehicle side, and to prevent the edge on the front end of the locking cutout section from hitting against the fastening member. Therefore, downward displacement of the bracket on the column side with respect to the bracket on the vehicle side is prevented, so it is possible to prevent the steering wheel, which is supported by the bracket on the column side by way of the steering column, from dropping excessively. As a result, depending on the extent of the collision accident, it is possible to maintain operability of the steering wheel, making it easier to perform the work of moving the vehicle that was in the accident out of the way, such as to the side of the road.

BRIEF DESCRIPTION OF THE DRAWINGS

FIG. 6A is a perspective view illustrating the outside sliding plate, and FIG. 6B is a perspective view illustrating the inside sliding plate.

FIGS. 40A and 40B are drawings illustrating a sliding plate that is used in a second embodiment, where FIG. 40A is perspective view as seen from above in the front with the bottom section omitted, and FIG. 40B is a perspective view as seen from above in the front with the top section omitted.

DETAILED DESCRIPTION OF THE INVENTION

[Embodiment 1, Example 1]

Figure 1:
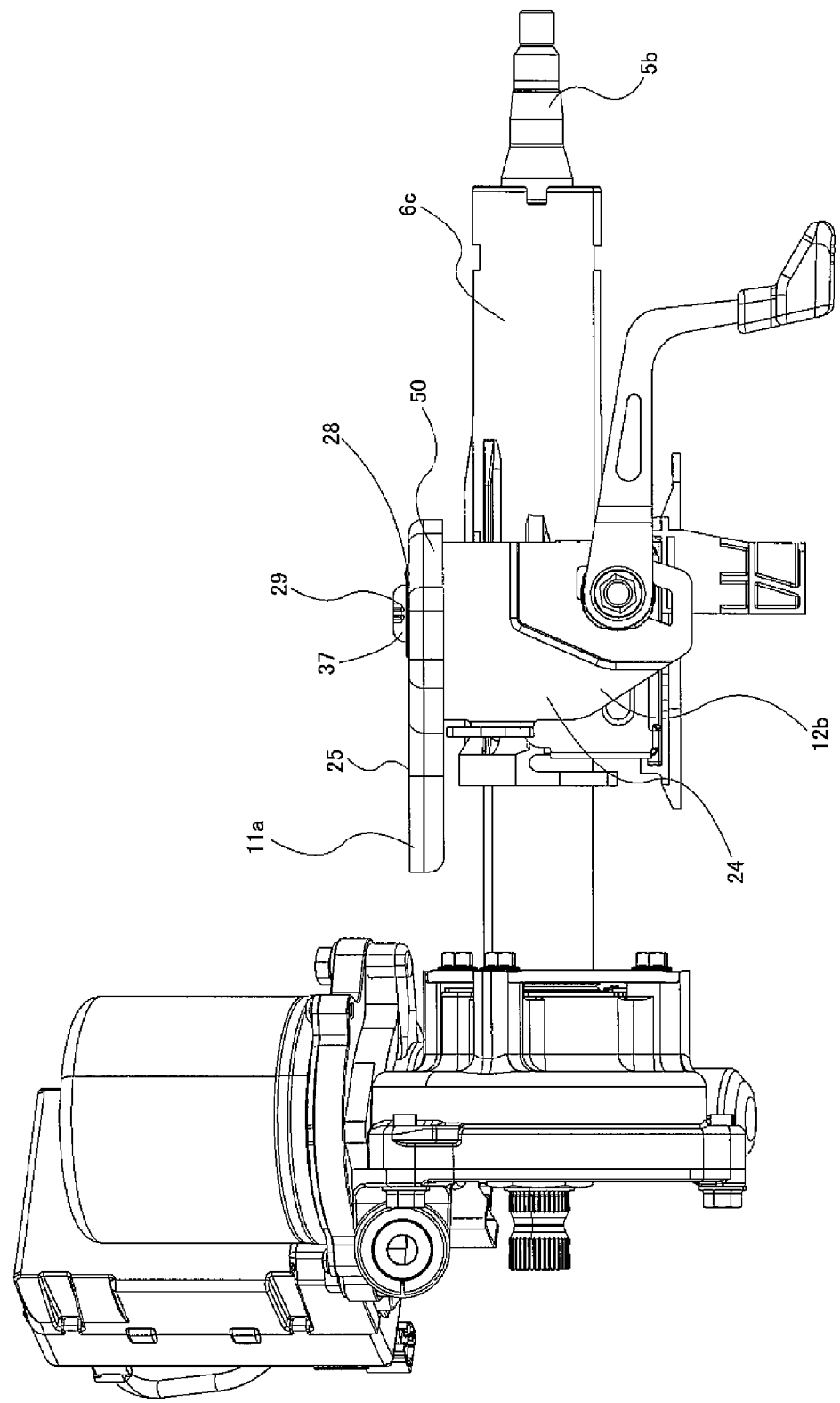
FIG. 1 is a side view illustrating a first example of a first embodiment of the present invention.
Figure 2:
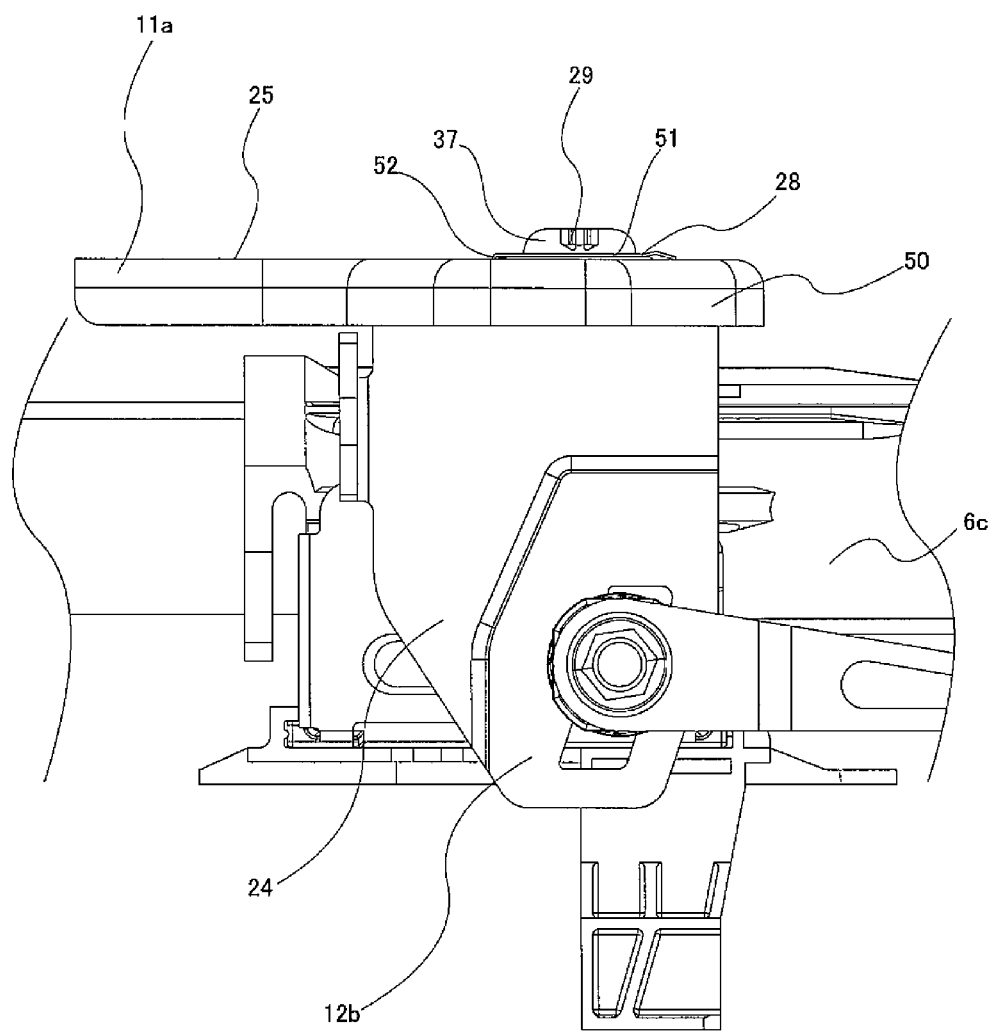
FIG. 2 is an enlarged view of the center section in FIG. 1.

FIG. 1 to FIG. 6 illustrate a first example of a first embodiment of the present invention. The steering support apparatus to which the present invention is applied, basically comprises: a bracket 11a on the vehicle side that is made of metal, is fastened to the vehicle body in at least two locations on both sides in the width direction, does not displace in the forward direction during a secondary collision, and has a locking cutout section that is located between the two locations on both sides in the width direction and that extends in the forward/backward direction; and a bracket 12b on the column side that is made of metal, is located on the underneath side of the bracket 11a on the vehicle side, supports the steering column and has a top plate section 23 on the top end section that has a width dimension that is greater than the width dimension of the locking cutout section. A feature of the present invention is the construction for supporting the bracket 12b on the column side, which supports the steering column 6c, by the bracket 11a on the vehicle side, which is supported by the vehicle body, so that that bracket 12b on the column side can break away in the forward direction due to impact that occurs during a secondary collision. Therefore, the construction and function of other parts of the steering column support apparatus, including the construction for supporting the steering column 6c by the bracket 12b on the column side, are the mostly the same as a known steering column support apparatus, so that construction is illustrated only in the figures and any explanation is omitted, with the explanation below centering only on the construction for supporting the bracket 12b on the column side by the bracket 11a on the vehicle side.

The bracket 12b on the column side is made of metal plate such as carbon steel plate that has sufficient strength and rigidity, and is formed by bending that metal plate into a U shape that is open on the lower portion. More specifically, the bracket 12b on the column side comprises a top plate section 23 that is formed on the top end section, and a pair of left and right support plate sections 24 that are bent and extend from the edges on both the left and right sides of the top plate section 23. The steering column 6c, with the steering shaft 5b supported on the inside such that the steering shaft 5b can rotate freely, is supported by the support plate sections 24 on both sides using known construction so that the up/down position and forward/backward position can be adjusted.

On the other hand, the bracket 11a is also similarly made of metal plate such as carbon steel plate having sufficient strength and rigidity, and is formed by performing a punching process using a press on this metal plate raw material and performing a cutting process using a laser cutter or the like to form the bracket into a specified shape. In the example in the figure, the edge sections around a flat shaped base plate section 25, except for the edge on the front end section (in other words, the edge sections on both sides and the edge section on the rear end), are bent downward to form a bent edge section 50, which makes it possible to make the bracket both lightweight and rigid.

The width dimension of the bracket 11a on the vehicle side is narrow in the front half section and wider in the rear half section. In the rear half section, through holes 26 are formed at two locations on the left and right near both edges in the width direction. The bracket 11a on the vehicle side is fastened to the vehicle body by way of bolts or studs that are inserted through these through holes 26. In this state, the bracket 11a on the vehicle side does not displace even during a secondary collision. In the portion of this bracket 11a on the vehicle side between the through holes 26 on both sides in the width direction of the bracket 11a on the vehicle side, two parallel through holes 27 that are long in the forward/backward direction are formed as the locking cutout section. The planar shape of the rear end section of these through holes 27 is inclined such that the width dimension becomes smaller going toward the rear to form a V shape, and the rear end edge of this rear end section is formed into an arc shape that follows the outer circumferential shape of the bolt 29, which is the fastening member.

The bracket 12b on the column side is supported by the bracket 11a on the vehicle side such that the bracket 12b on the column side can break away in the forward direction (displace further in the forward direction than the normal state) due to an impact load that is applied during a secondary collision. In order for that, in the case of the steering column support apparatus of this example, the top plate section 23 of the bracket 12b on the column side is connected to the rear end side of the through holes 27 of the bracket 11a on the vehicle side by a pair of sliding member 28 and a bolt 29 and a nut 30 as a fastening member for the respective through holes 27. These sliding members 28 are made of thin metal plate such as carbon steel plate or stainless steel plate, and these sliding members 28 comprise a pair of top and bottom sliding plates 31a, 31b that have a width dimension that is greater than the width dimension of the through holes 27, which are locking cutout sections, in the bracket 11a on the vehicle side. In this example, these sliding members 28 are formed by overlapping an outside sliding plate 51 as illustrated in FIG. 6A, and an inside sliding plate 52 as illustrated in FIG. 6B. These sliding plates 51, 52 have a pair of top and bottom sliding plate sections 31a, 31b that are parallel with each other. The width dimension W of these sliding plate sections 31a, 31b is sufficiently larger than the width dimension w of the through holes 27 (W>w).

Of these sliding plate sections 31a, 31b, the pair of sliding plate sections 31a is provided with through holes 53 formed in portions of the center sections thereof which are aligned with each other. Moreover, the edges on the front ends of these top and bottom sliding plate sections 31a are connected by a connecting section 33a to form a single outside sliding plate 51. On the other hand, by forming notches 32 that are open toward the front end edge in the center section in the width direction in the pair of sliding plates 3 1b of the inside sliding plate 52, a fork shape is formed. The front end edges of the top and bottom sliding plate sections 31b are connected by a pair of left and right connecting sections 33b such that the opening on the front end of the top and bottom notch sections 32 are located in between. The width dimension of the pairs of connecting sections 33a, 33b (space D between the edges on the outer ends that are located on opposite sides) that are provided on the outside and inside sliding plates 51, 52 is equal to or less than the width dimension w of the through holes 27 (D≦w). When the dimension is less than the width dimension of the through holes 27, there is no question about the size relationship between the width dimension of the connecting section 33a and the width dimension of the connecting sections 33b, 33b.

Figure 3:
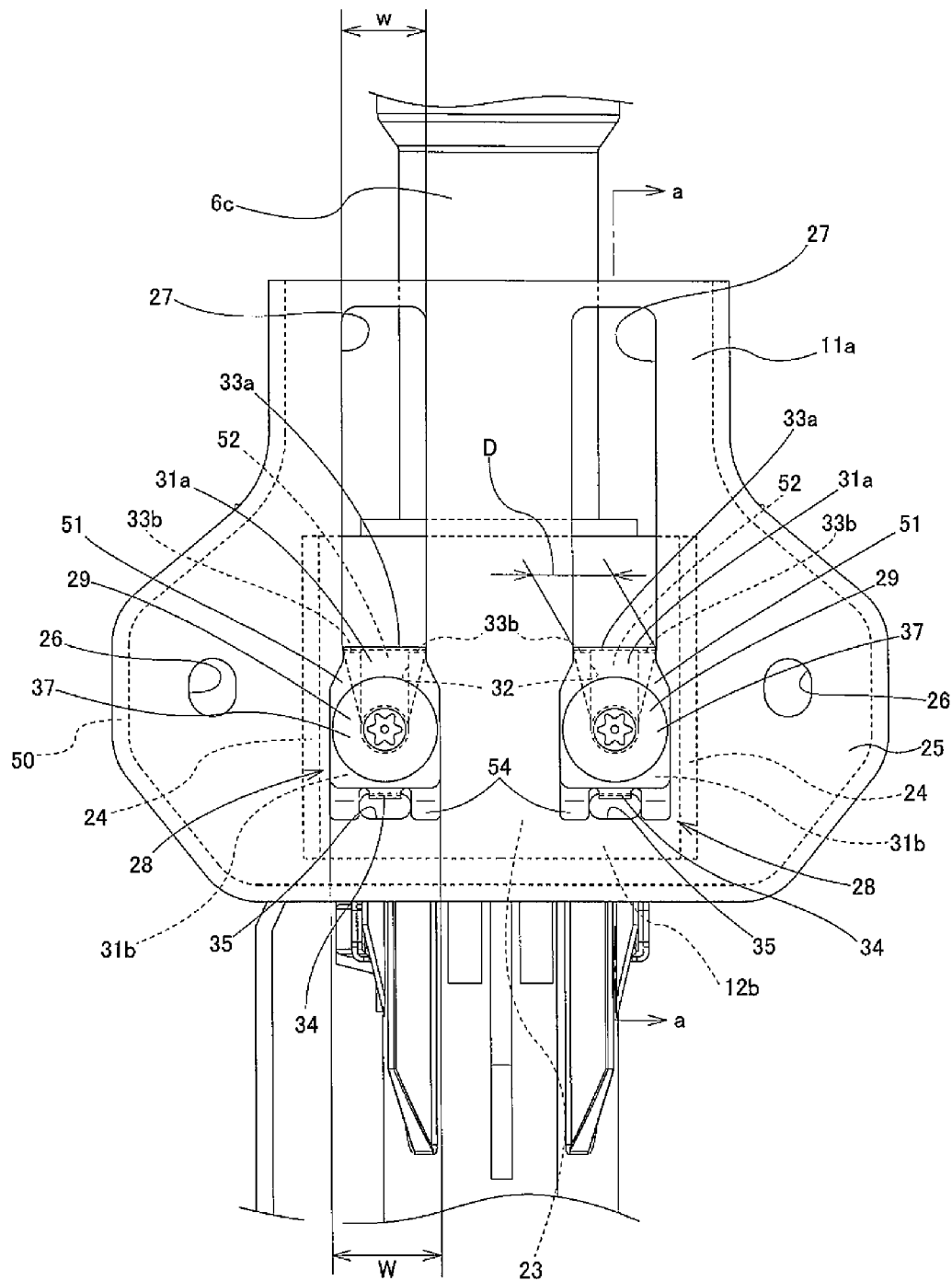
FIG. 3 is a top view of FIG. 1.
Figure 4:
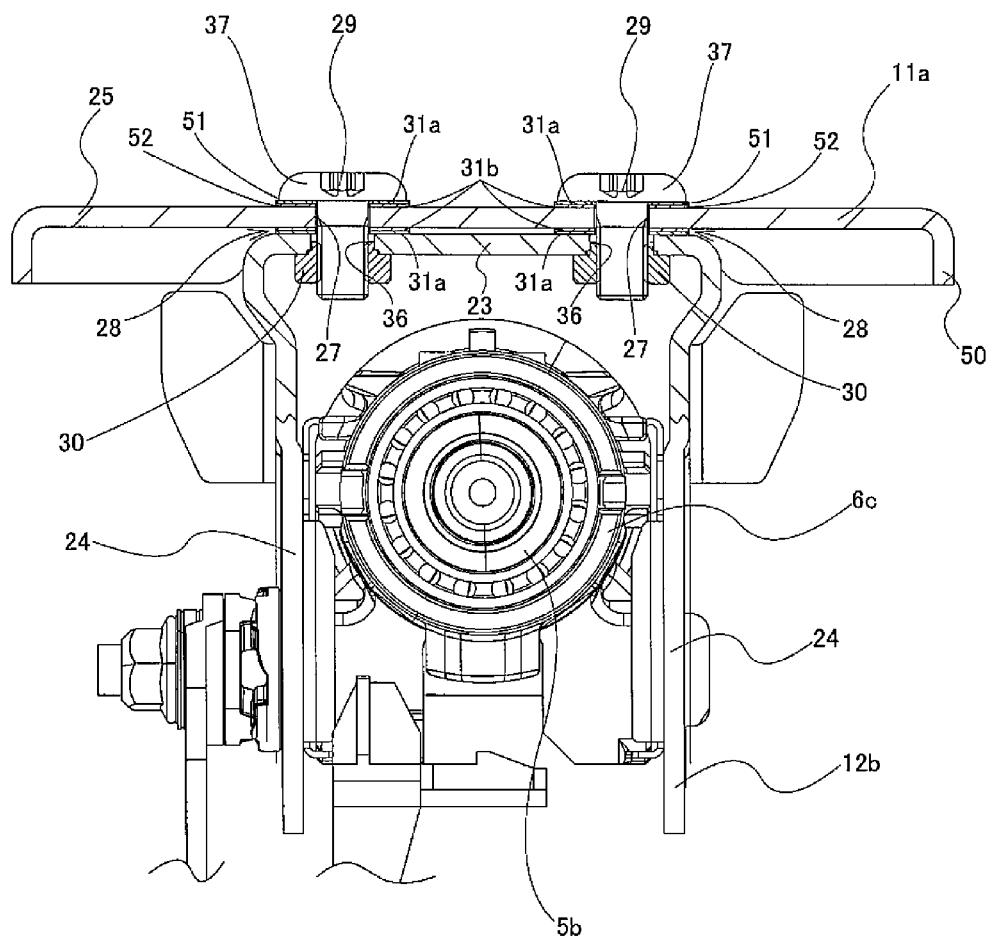
FIG. 4 is a front view as seen from the right in FIG. 1, and illustrates the state where part is transparent or cut away.
Figure 5:
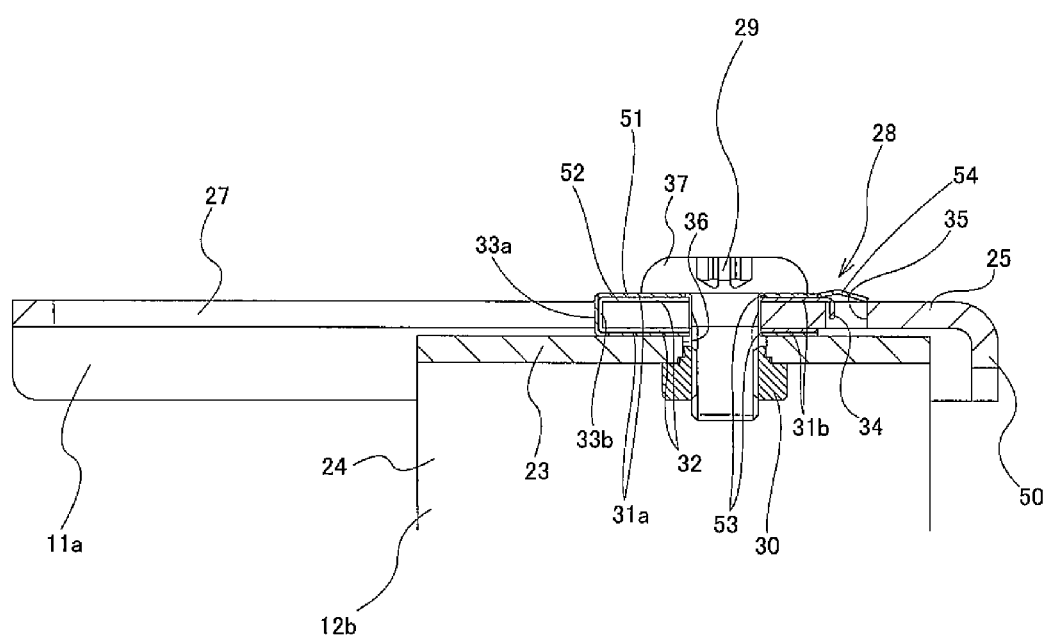
FIG. 5 is a cross-sectional view of section a-a in FIG. 3, and illustrates a state where part is omitted or transparent.
Figure 6:
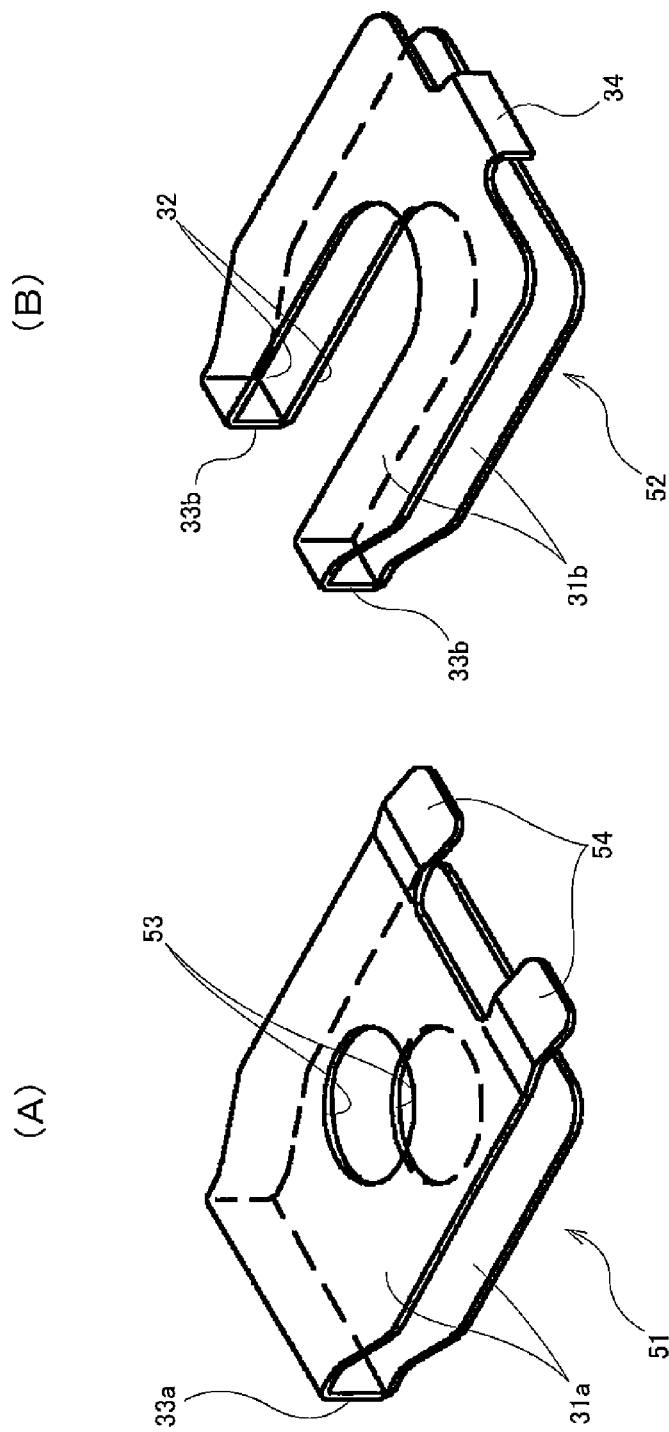
FIG. 6A and FIG. 6B illustrate overlapping sliding members, where

As illustrated in FIG. 3 to FIG. 5, the sliding member 28 of this example is constructed such that the pair of top and bottom sliding plate sections 31b of the inside sliding plate 52 are held between the pair of top and bottom sliding plate sections 31a of the outside sliding plate 51. In this state, on the top side, the bottom surface of the sliding plate section 31a and the top surface of the sliding plate section 31b come in contact, and on the bottom side, the top surface of the sliding plate section 31a and the bottom surface of the sliding plate section 31b come in contact. Moreover, the through holes 53 are positioned at the rear end section of the notch sections 32. In the case of this example, a coating layer made of a low-friction material such as polytetrafluoroethylene resin, polyamide resin, molybdenum disulfide and the like is formed on one surface of each of the outside and inside sliding plates 51, 52 on the side where they come in contact with each other. In the state of combining these sliding plates 51, 52 to form the sliding member 28, the coating layer exists between the surfaces of the sliding plates 51, 52 that are in contact with each other. Therefore, it is possible to keep the load required to cause the inside sliding plate 52 to come out from the outside sliding plate 51 low.

Moreover, an engaging section 34 that is bent downward at a right angle is formed in part of the inside sliding plate 52 in the center section of the edge on the rear end of the sliding plate section 31b on the top side. On the other hand, an engaging hole 35 for fastening with the engaging section 34 is formed in part of the bracket 11a on the vehicle side in the portion nearer to the rear than the rear end section of the through hole 27. Furthermore, elastic ground tabs 54 for maintaining the flow of electric power are formed on part of the outside sliding plate 51 on both end sections in the width direction of the rear end edge of the sliding plate 31a on the top side. The tip end edges of these elastic ground tabs 54 are not coated with a coating layer, and are exposed metal.

In order to connect the top plate 23 on the top end section of the bracket 12b on the column side to the bracket 11a on the vehicle side, first, both of the sliding members 28 are assembled in the rear end section. In this assembly work, the sliding members 28 are fitted inside the bracket 11*a* on the vehicle side in the portions from the front half section to the middle section of the through holes 27 so that the sliding plate sections 31*a*, 31*b* of the sliding plates 51, 52 are placed above and below the bracket 11*a* on the vehicle side, and with the direction aligned with the forward/backward direction of the through holes 27, the connection sections 33*a*, 33*b* placed inside the through holes 27, these sliding members 28 are moved inside the through holes 27 to the rear end side. In this way, both end sections in the width direction of these sliding plate sections 31*a*, 31*b* are placed so that portions of the bracket 11*a* on the vehicle side on both sides of the through holes 27, which are locking cutout sections, are held from both the top and bottom sides. Furthermore, by elastically deforming the sliding plate sections 311*a*, 31*b* upward and then locking the engaging sections 34 into the engaging holes 35, the sliding members 28 are assembled in a specified location at the rear end section of the through holes 27 so that they do not accidentally drop. At the same time, the tip end edge of the elastic tabs 54 are brought into elastic contact with the top surface of the bracket 11*a* on the vehicle side, causing the bracket 11*a* on the vehicle side and the outside sliding plate 51 to conduct electricity.

Next, the upper surface of the top plate section 23 that is formed on the top end section of the bracket 12*b* on the column side comes in contact with the bottom surface of the base plate section 25 of the bracket 11*a* on the vehicle side by way of the sliding plate sections 31*a*, 31*b* on the bottom side of the sliding plates 51, 52 of the sliding members 28. The pair of left and right installation holes 36 that are formed in the top plate section 23 and the through holes 53 in the outside sliding plates 51, and the rear end sections of the notch sections in the inside sliding plates 52 are aligned. In this state, the rod shaped sections of the bolts 29, which are fastening members, are inserted from above through the through holes 53, rear end sections of the notch sections 32 and the installation holes 36. Then nuts 30 are screwed onto the portions on the bottom end sections of the bolts 29 that are inserted through the sliding members 28 and protrude from the bottom surface of the top plate section, and tightened to a specified torque. These nuts 30 are fitted in and supported by the installation hole 36 beforehand, so the work of screwing together and tightening these nuts 30 and bolts 29 can be performed easily. In the state where these nuts 30 and bolts are tightened, a part of the base plate section 25 of the bracket 11*a* on the vehicle side is held between the bottom surface of the head sections 37 of these bolts 29, which corresponds to restraining portions formed on the top end section of the fastening members, and the top surface of the top plate section 23 of the bracket 12*b* on the column side by way of the sliding plate sections 31*a*, 31*b*.

In this way, the top plate section 23 of the bracket 12*b* on the column side is connected to the bracket 11 a on the vehicle side so that the bracket 12*b* on the column side can break away in the forward direction due to impact energy that is applied during a secondary collision. During a secondary collision, of the sliding members 28, the outside sliding plates 51 slide in the forward direction with respect to the inside sliding plates 52. In other words, there is no coating layer made of low-friction material between these inside sliding plates 52 and the bracket 11*a* on the vehicle side, and the engaging sections 34 are locked in the engaging holes 35, so the resistance against displacement in the forward direction is relatively large. On the other hand, there is a coating layer between the outside sliding plates 51 and the inside sliding plates 52, so the resistance against displacement in the forward direction is small. Therefore, the outside sliding plates 51, together with the bolts 29, slide in the forward direction with respect to the inside sliding plates 52, and the bolts 29 and bracket 12*b* on the column side displace in the forward direction together with the outside sliding plates 51. In this way, the break away load, which is required for forward displacement of the bracket 12*b* on the column side, is small due to the existence of the coating layer. Moreover, after the inside sliding plate 52 has come out toward the rear from the inside of the outside sliding plate 51, there is no longer the sliding plate sections 31*b* of the inside sliding plates 52 between the bottom surface of the head sections 37 of the bolts 29 and the top surface of the top plate section 23 of the bracket 12*b* on the column side, which hold the base plate section of the bracket 11*a* on the vehicle side. Therefore, only in the engagement section between the bracket 12*b* on the column side and the bracket 11*a* on the vehicle side, there is hardly any resistance against displacement in the forward direction of the bolts 29 and bracket 12*b* on the column side.

With the construction of this example, not only is it possible to simplify tuning for stabilizing forward displacement of the steering wheel during a secondary collision, it is also possible to further lower and stabilize the break away load. As described above, by holding part of the bracket 11*a* on the vehicle side by part of the pair of top and bottom sliding plate sections 31*a*, 31*b* of the sliding member 28, the existence of these sliding plate sections 31*a*, 31*b* makes it possible to keep the friction force that acts between both the top and bottom surfaces of the bracket 11*a* on the vehicle side and the bottom surfaces of the head sections 37, which are the restraining portions of the bolts 29 that are the fastening members, and the top surface of the top plate section 23 of the bracket 12*b* on the column side. The value of this break away load can be arbitrarily adjusted by adjusting the tightening torque of the bolts 29 and nuts 30. With the existence of a coating layer, even after the tightening torque has been increased to a certain extent, it is still possible to keep the break away load low, so it is possible to sufficiently maintain support strength for the bracket 11*a* on the vehicle side to support the bracket 12*b* on the column side. It is also possible to sufficiently maintain support rigidity of the steering wheel 1 that is supported by the bracket 12*b* on the column side by way of the steering column 6*c*. Preferably, after the bolts 29 and nuts 30 have been tightened, treatment such as crushing is performed on the tip end section of the male screw portion of the bolts 29 in order to prevent loosening.

Furthermore, in this example, construction has been achieved that is capable of preventing the steering wheel from dropping excessively during a secondary collision. Therefore, in this example, the length in the forward/backward direction of the through holes 27 is long enough so that after a secondary collision has advanced, or on other words, when the steering column 6*c* has displaced as far as possible in the forward direction due to the impact energy that is applied to the steering wheel 1 from the body of the driver during a secondary collision, the bolts 29 will not hit against the edges on the front ends of the through holes 27.

Furthermore, in this example, it is not illustrated in the figures, however, an energy absorbing member, which allows forward displacement in the forward direction of the bracket 12*b* on the column side by plastically deforming, is provided between the portion of the steering column 6*c* or the portion of the bracket 12*b* on the column side that displaces in the forward direction together with the steering column 6*c*, and the portion that is fastened to the vehicle side, which includes the bracket 11*a* on the vehicle side and the vehicle body, that does not displace during a secondary collision. During a secondary collision, the bolts 29 and the top plate section 23 of the bracket 12*b* on the column side begin to displace in the forward direction with respect to the bracket 11*a* on the vehicle side due to the break away load. This displacement causes the energy absorbing member to plastically deform and absorb the impact energy that is transmitted to the bracket 12*b* on the column side from the body of the driver. Various kinds of known energy absorbing members can be used as this energy absorbing member, so in the explanation of this example, drawings and detailed explanation of this energy absorbing member are omitted.

[Embodiment 1, Example 2]

Figure 7:
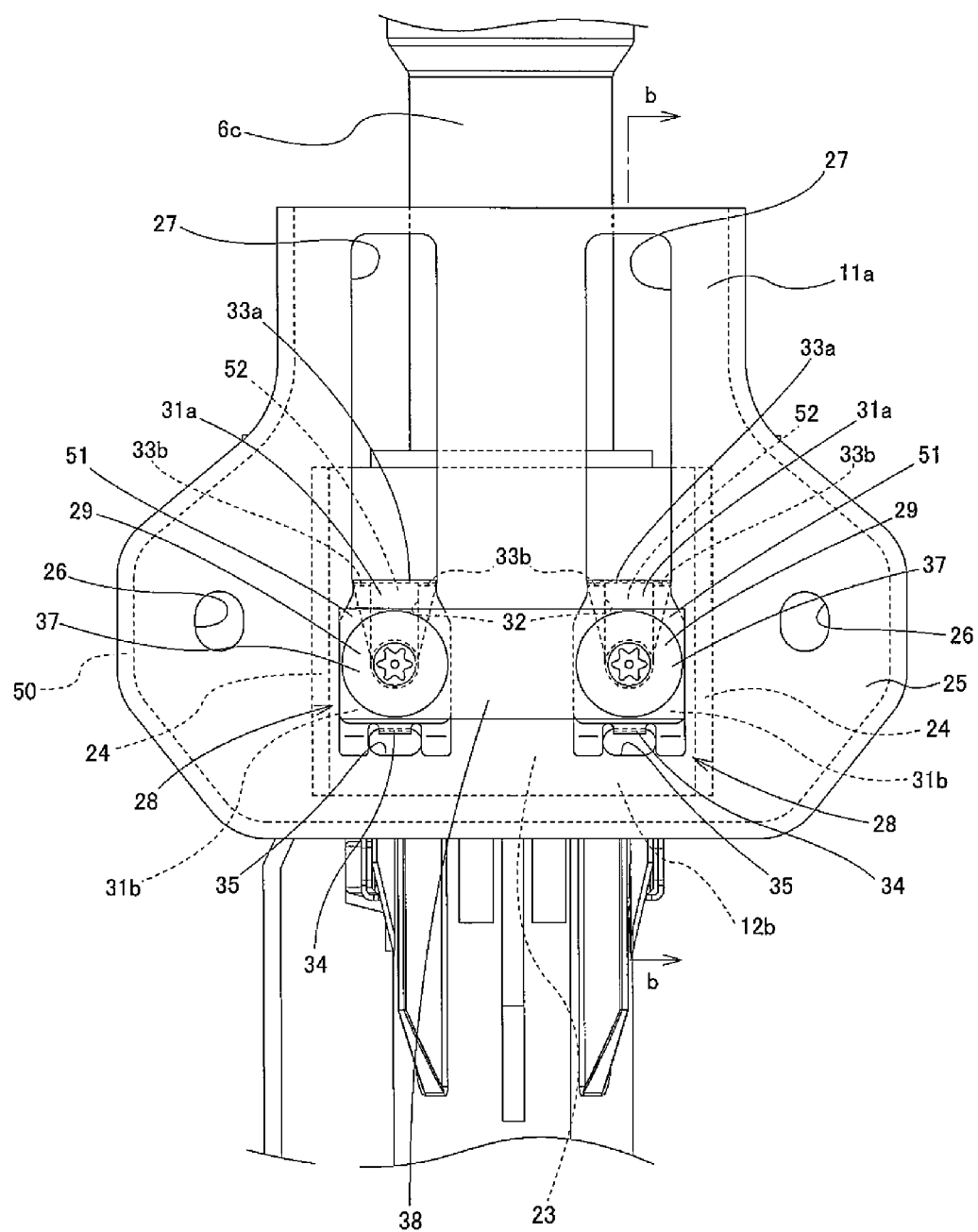
FIG. 7 is a drawing similar to FIG. 3, and illustrates a second example of a first embodiment of the present invention.
Figure 8:
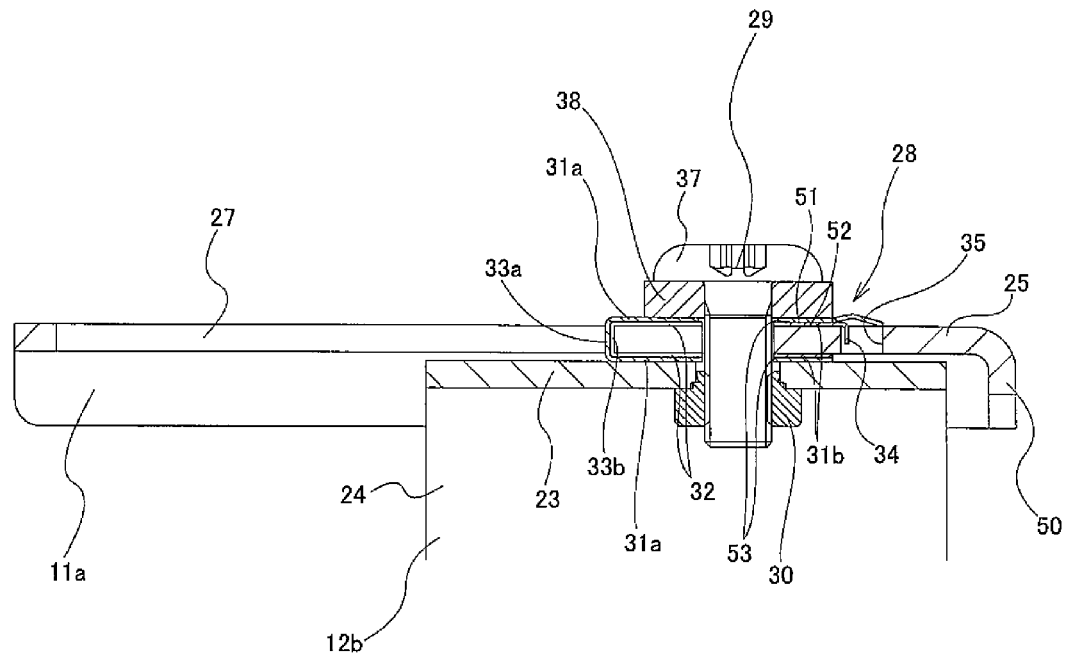
FIG. 8 is a cross-sectional view of section b-b in FIG. 7, and illustrates the state where part is omitted or transparent.

FIG. 7 and FIG. 8 illustrate a second example of the first embodiment of the present invention. In this example, a rectangular reinforcing plate 38 that is long in the left to right width direction is provided on the top side of the pair of sliding members 28, and spans between these sliding members 28. The top surface of the reinforcing plate 38 is pressed downward toward the base plate section 25 of the bracket 11*a* on the vehicle side by the head sections 37 of the pair of left and right bolts 29.

In the construction of this example, it is possible to stabilized the top surfaces of the sliding members 28, and further stabilize the connecting force between the bracket 11*a* on the vehicle side and the bracket 12*b* on the column side. It is also possible to alternatively or additionally stabilize the tightening force of the bolts 29 and nuts 30 even though separate washers may be used, so it is possible to further stabilize the break away load. The construction and function of other parts are the same as in the first example, so drawings and explanations of identical parts are omitted.

[Embodiment 1, Example 3]

Figure 9:
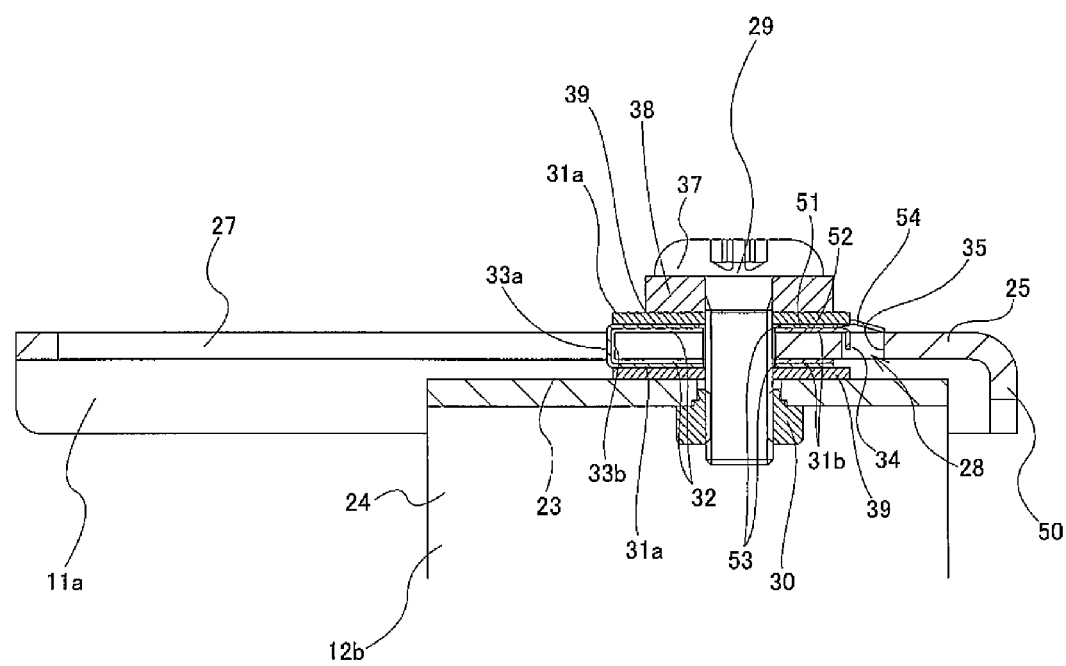
FIG. 9 illustrates a third example of the first embodiment of the present invention, and is a partial cross-sectional view as seen from the same direction as in FIG. 5.

FIG. 9 illustrates a third example of the first embodiment of the present invention. In this example, auxiliary sliding plates 39 are held between the bottom surface of the reinforcing plate 38 and the top surfaces of the sliding plate sections 31*a* on the top side of the sliding members 28, and between the top surface of the top plate section 23 of the bracket 12*b* on the column side and the bottom surfaces of the sliding plate sections 31*a* on the bottom side of the sliding members 28. The surfaces of these auxiliary sliding plates 39 that face the top or bottom surfaces of the sliding members 28 are coated with a coating layer made of a low-friction material such as polytetrafluoroethylene resin, polyamide resin, molybdenum disulfide and the like.

In the case of the construction of this example, sliding occurs between coating layers made of low-friction material during a secondary collision, so it is possible to further lower and stabilize the break away load during a secondary collision. The construction and function of other parts are the same as in the second example, so drawings and explanations of identical part are omitted.

[Embodiment 1, Example 4]

Figure 10:
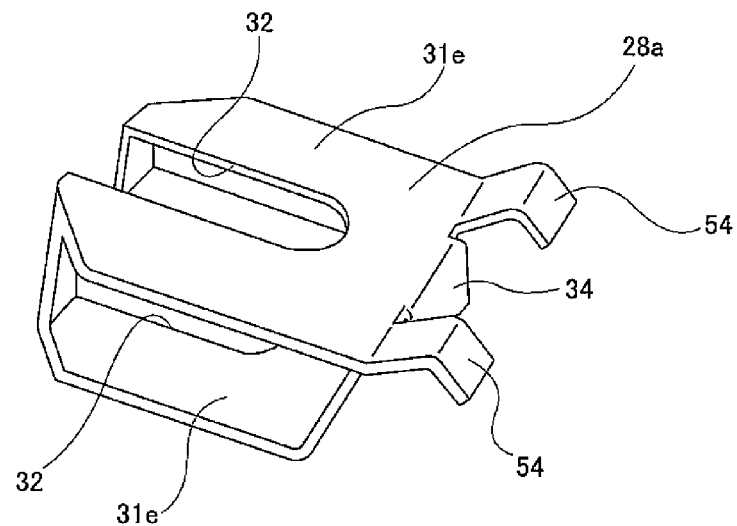
FIG. 10 illustrates a fourth example of the first embodiment of the present invention, and is a perspective view of a sliding member.
Figure 11:
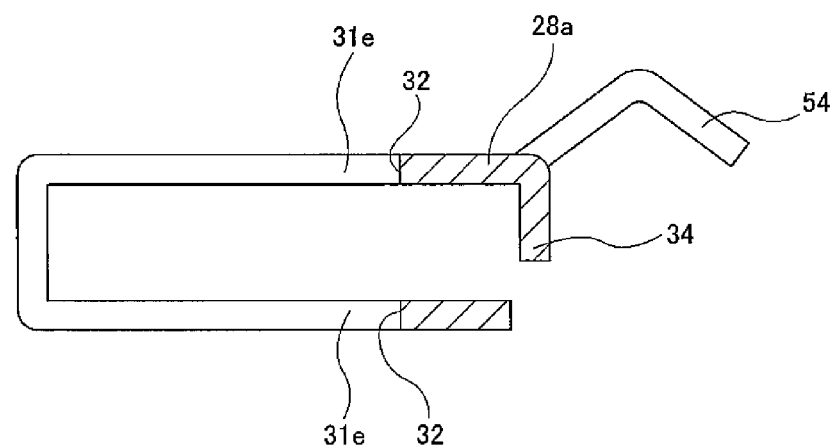
FIG. 11 is a cross-sectional view of the sliding member in FIG. 10.

FIG. 10 and FIG. 11 illustrate another example of the sliding member as a fourth example of the first embodiment of the present invention. This sliding member 28*a* is formed by bending a metal plate, such as carbon steel plate or stainless steel plate. The sliding member 28*a* is a single member, however, the shape is such that in addition to the engaging section 34 on the edge section on the rear end of the inside sliding plate 52 illustrated in FIG. 6B, there is an additional pair of left and right elastic tabs 54. This sliding member 28*a* is used in the place of the sliding member 28 in the first through third example of the first embodiment.

In the construction of the steering column support apparatus in which these sliding members 28*a* are assembled, the bracket 12*b* on the column side displaces together with the bolts 29 (FIGS. 1 to 5) in the forward direction while sliding with respect to the sliding members 28*a*. Therefore, a coating layer made of low-friction material is formed on at least the top surface of the sliding plate section 31*e* on the top side and the bottom surface of the sliding plate section 31*e* on the bottom side of the pair of top and bottom sliding plate sections 31*e* of the sliding members 28*a*. By forming a coating layer on both the top and bottom surfaces of these sliding plate sections 31*e*, it is possible for the sliding members 28*a* to also displace in the forward direction due to the state of the secondary collision. Moreover, by forming a through hole 53 as in the outside sliding plate 51 illustrated in FIG. 6A instead of the notch section 32 illustrated in FIG. 10, it is possible to cause the sliding members 28*a* to displace in the forward direction together with the bracket 12*b* on the column side and the bolts 29 during the secondary collision. In this case, a coating layer made of a low-friction material is formed on at least the bottom surface of the sliding plate section 31*e* on the top side and the top surface of the sliding plate section 31*e* on the bottom side.

[Embodiment 1, Example 5]

Figure 12:
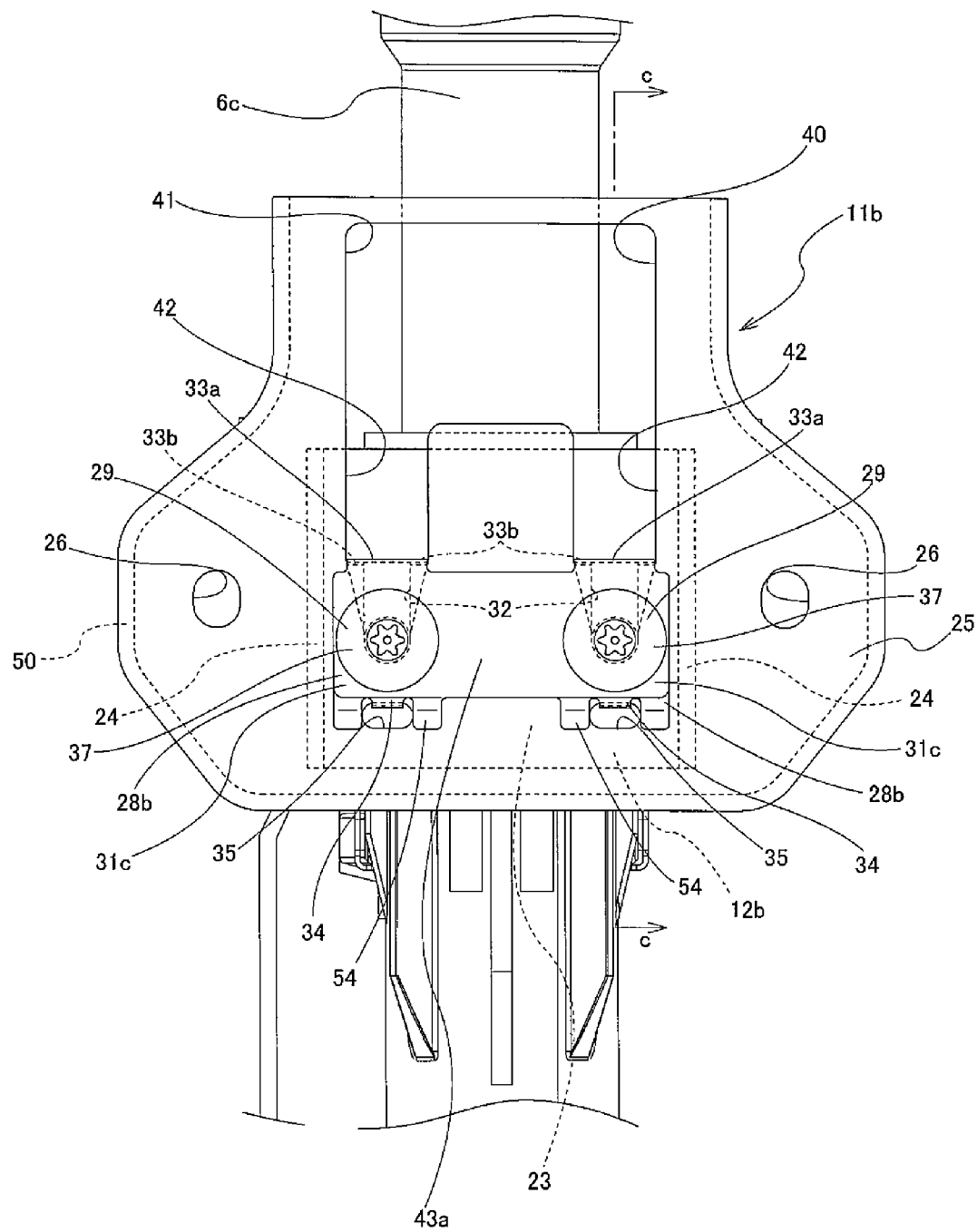
FIG. 12 illustrates a fifth example of the first embodiment of the present invention, and is similar to FIG. 3.
Figure 13:
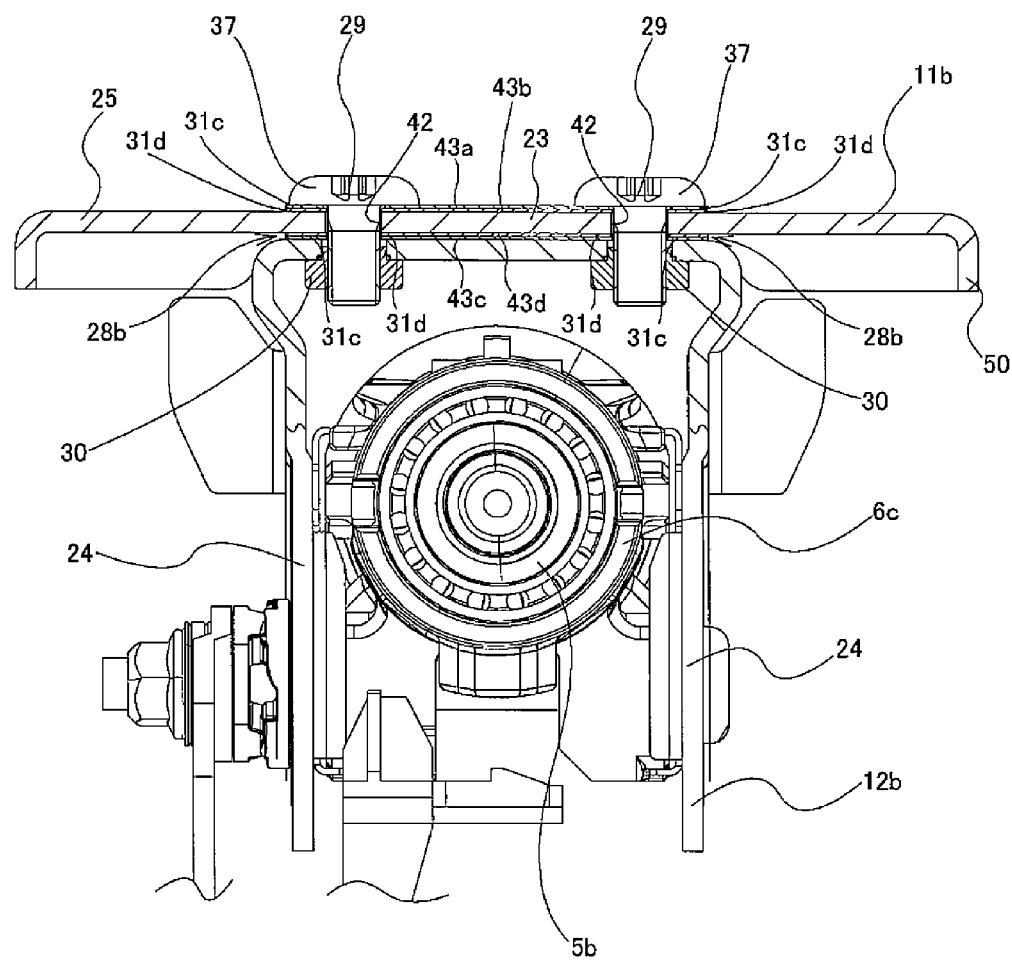
FIG. 13 is a drawing of the fifth example, and is similar to FIG. 4.
Figure 14:
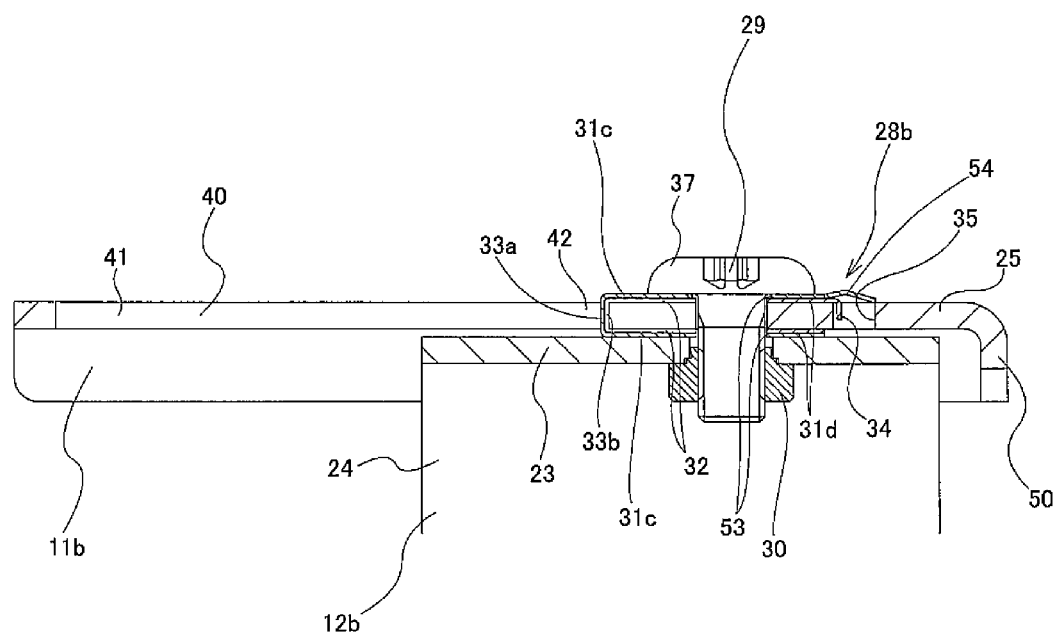
FIG. 14 is a cross-sectional view of section c-c in FIG. 12, and illustrates a state where part is omitted or transparent.

FIG. 12 to FIG. 14 illustrate a fifth example of the first embodiment of the present invention. In this example, a U-shaped though hole 40 is formed as the locking cutout section in the base plate section 25 of the bracket 11*b* on the vehicle side. This through hole 40 is constructed such that the front half section thereof forms into a wide section 41 and the rear half section thereof forms into two notch-shaped extending sections 42. These extending sections 42 extend to further toward the rear from both end sections in the width direction of the edge on the rear end of the wide section 41, are long in the forward/backward direction and are parallel with each other. As in first example, the planer shape of the rear end sections of these extending sections 42 is a V shape. Moreover, the sliding members 28*b*, and bolts 29 and nuts 30, which are fastening members, are located in the rear end sections of these extending sections 42.

The construction of the sliding members 28*b* is basically the same as that of the sliding members 28 in the first through third examples, or the sliding members 28*a* in the fourth example. However, in this example, as the locking cutout section is formed as the through hole 40 described above, one pair of sliding members 28*b* is formed from on metal plate, or the outside and inside sliding plates of a pair of sliding members 28*b* are each formed from one metal plate. In the case of the former construction, it is not illustrated in the figures, however, the sliding members 28*b* are connected together in the width direction by a joining section to form a single member. In the case of the latter construction, sliding plate sections 31*c*, 31*d* on the top side of the sliding members 28 are connected together in the width direction by joining sections 43*a*, 43*b*, and the sliding plate sections 31*c*, 31*d* on the bottom side are connected together in the width direction by joining sections 43*c*, 43*d* to form a single member.

In the case of this example, the pair of left and right sliding members 28*b* are taken to be a single members, so handling if these sliding members 28*b* is improved, and because managing parts and assembly work is also simplified, it is possible to reduce costs. The construction and function of other parts are the same as in the first example, so drawings and explanations of identical parts are omitted.

[Embodiment 1, Example 6]

Figure 15:
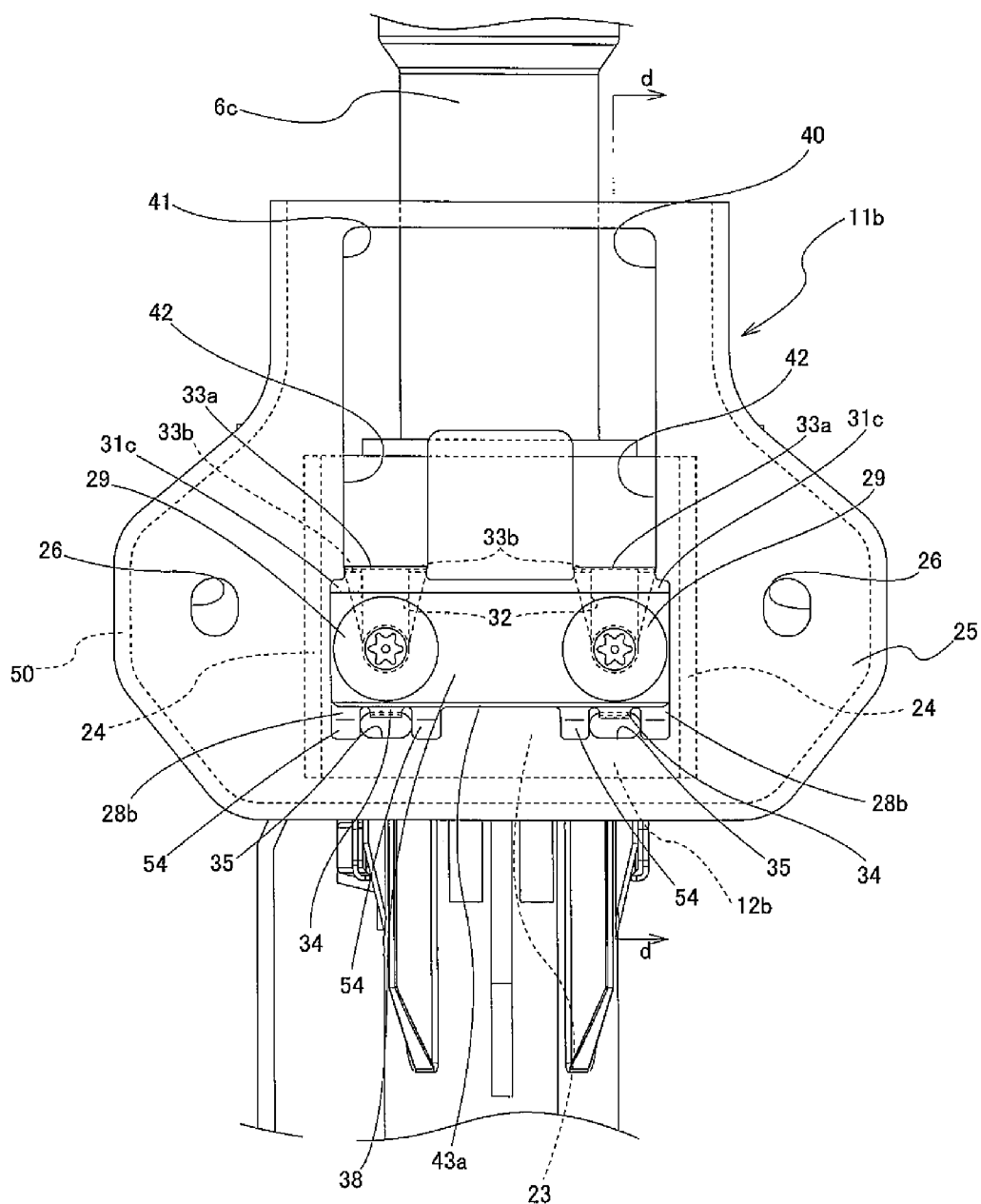
FIG. 15 illustrates a sixth example of a first embodiment of the present invention, and is a drawing similar to FIG. 3.
Figure 16:
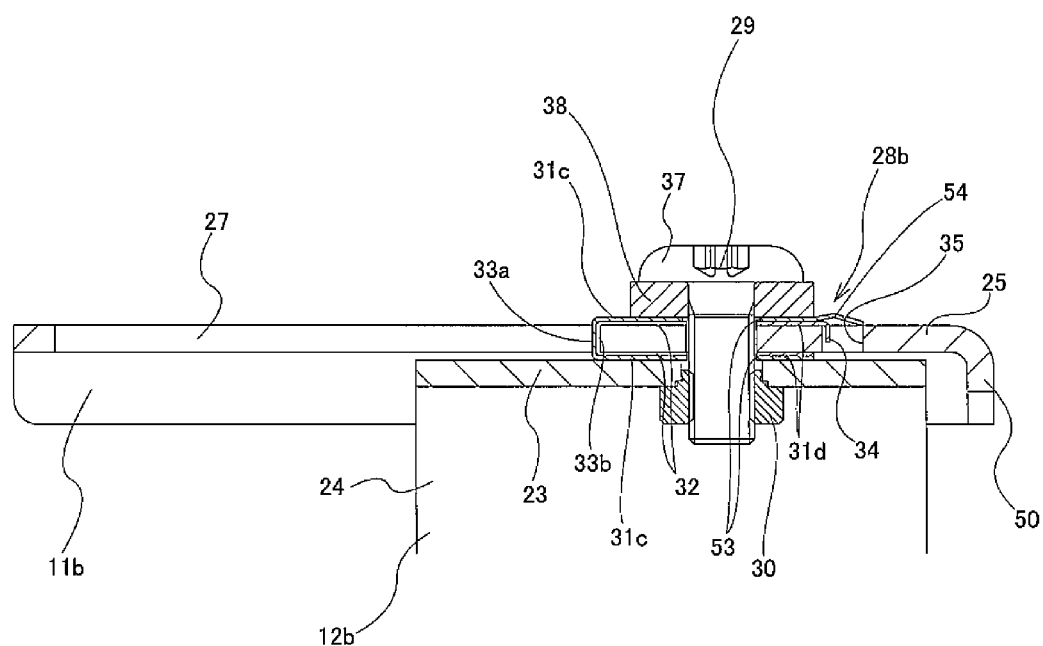
FIG. 16 is a cross-sectional view of section d-d in FIG. 15, and illustrates a state where part is omitted or transparent.

FIG. 15 and FIG. 16 illustrate a sixth example of the first embodiment of the present invention. In this example, a rectangular reinforcing plate 38 that is long in the left to right width direction is provided on the top side of a pair of left and right sliding members 28*b* and joining section 43*a* that are integrated as a single member, and spans between the left and right sliding members 28b. The function of this reinforcing plate 38 is the same as in the second example, and the construction and function of other parts are the same as in the first example, so explanations of identical parts are omitted.

[Embodiment 1, Example 7]

Figure 17:
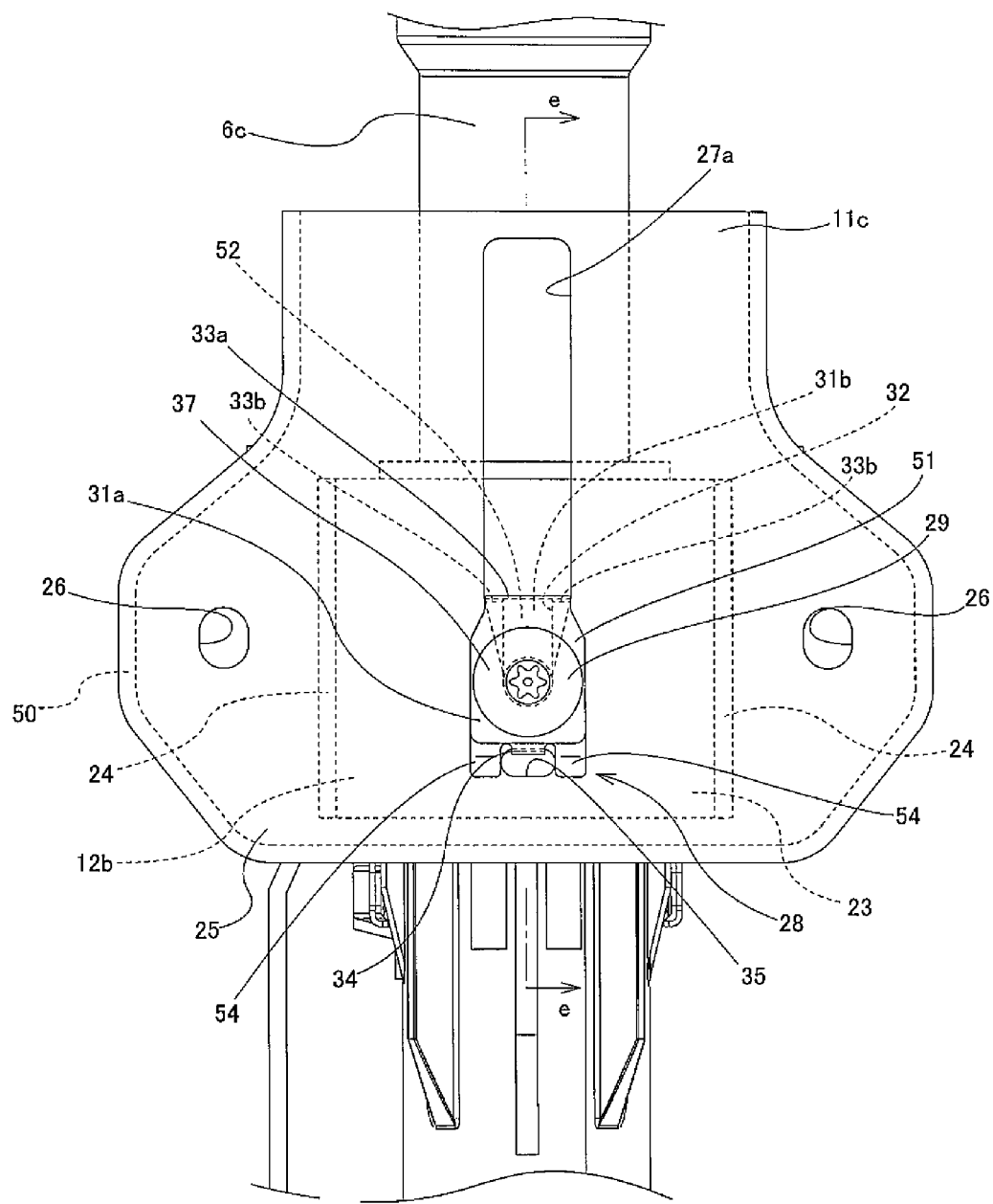
FIG. 17 illustrates a seventh example of the first embodiment of the present invention, and is a drawing similar to FIG. 3.
Figure 18:
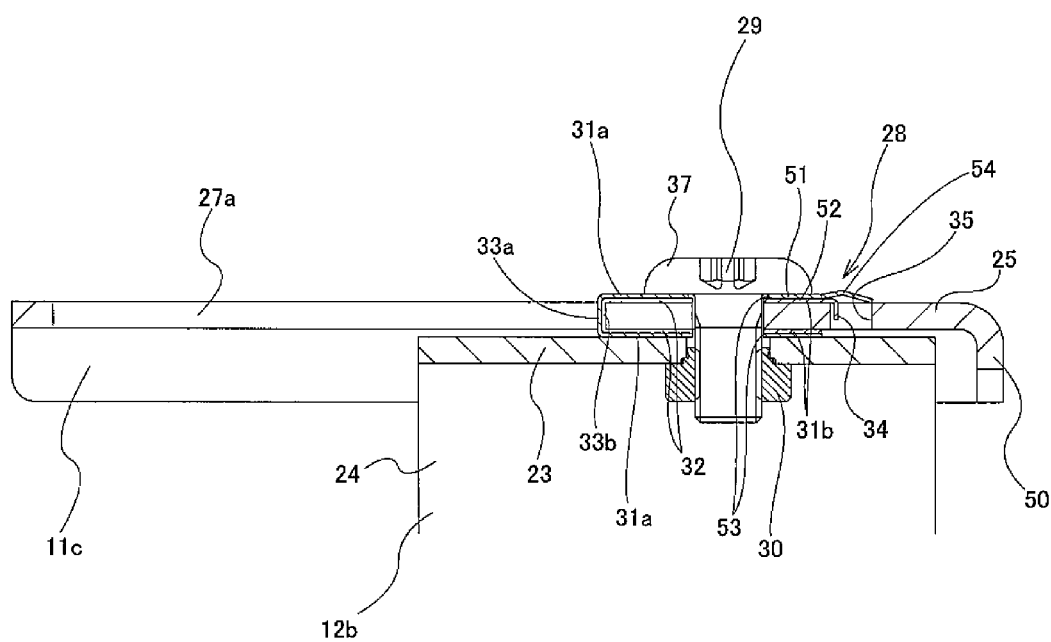
FIG. 18 is a cross-sectional view of section e-e in FIG. 17, and illustrates a state where part is omitted or transparent.

FIG. 17 and FIG. 18 illustrate a seventh example of the first embodiment of the present invention. In this example, the locking cutout section that is formed in the base plate section 25 of the bracket 11c on the vehicle side is one through hole 27a that is long in the forward/backward direction. This through hole 27a is formed in the center section of the portion between the pair of through holes 26 that are formed at two locations on both sides in the width direction of the base plate section 25. The sliding member 28, bolt 29 and nut 30, which are fastening members, are located in the rear end section of the through hole 27a.

In the construction of this example, by having only one set of a through hole 27a, sliding member 28, bolt 29 and nut 30, it is possible to further reduce costs and stabilize the break away load. In the case of employing the construction of this example as well, by holding a washer between the head section 37 of the bolt 29 and the top surface of the sliding member 28, it is possible to improve the support rigidity of supporting the bracket 12b on the column side by the bracket 11c on the vehicle side. Moreover, by holding an auxiliary sliding plate between the head section 37 and the top surface of the sliding member 28, it is possible to further lower and stabilize the break away load.

[Embodiment 1, Example 8]

Figure 19:
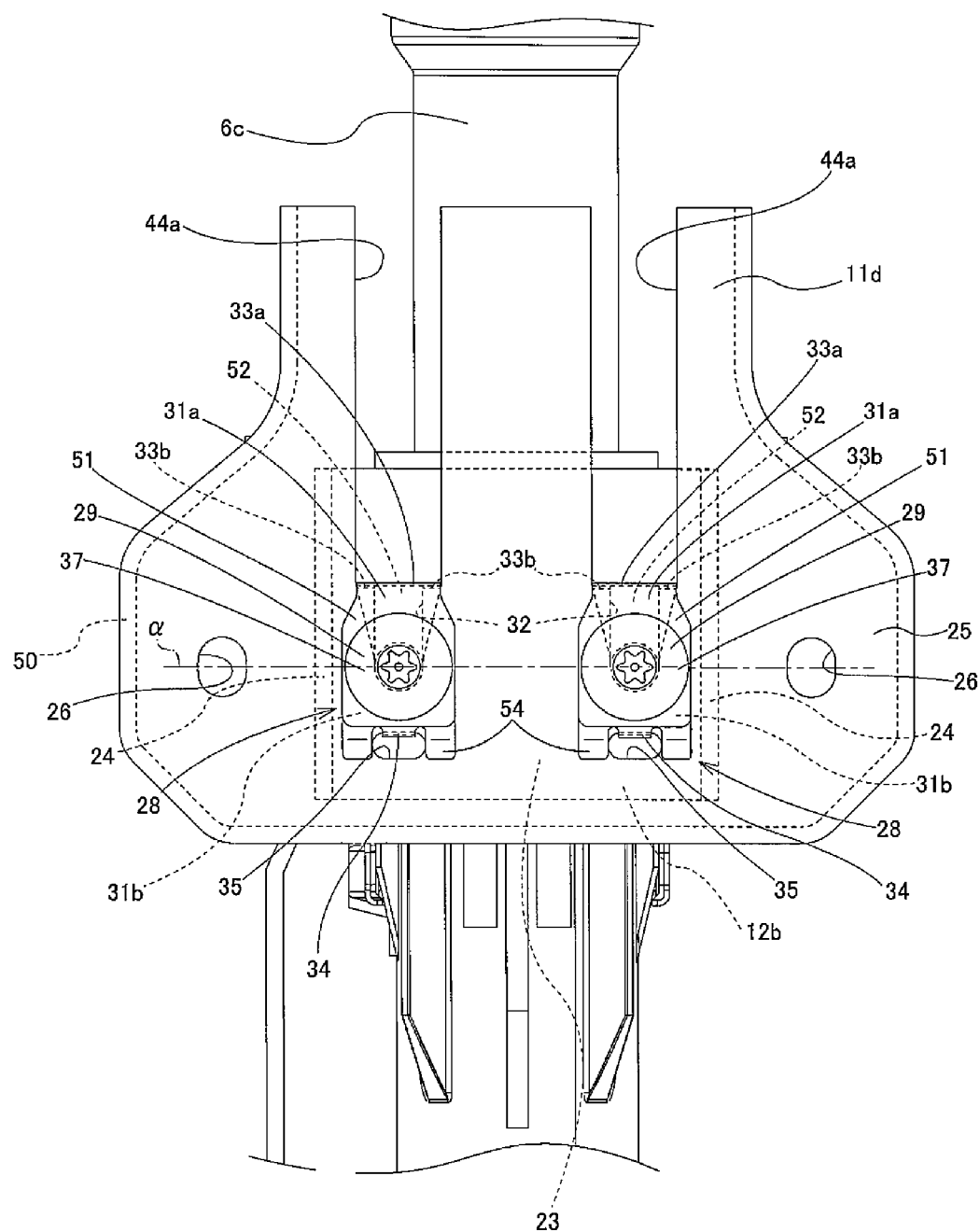
FIG. 19 illustrates an eighth example of the first embodiment of the present invention, and is a drawing similar to FIG. 3.
Figure 20:
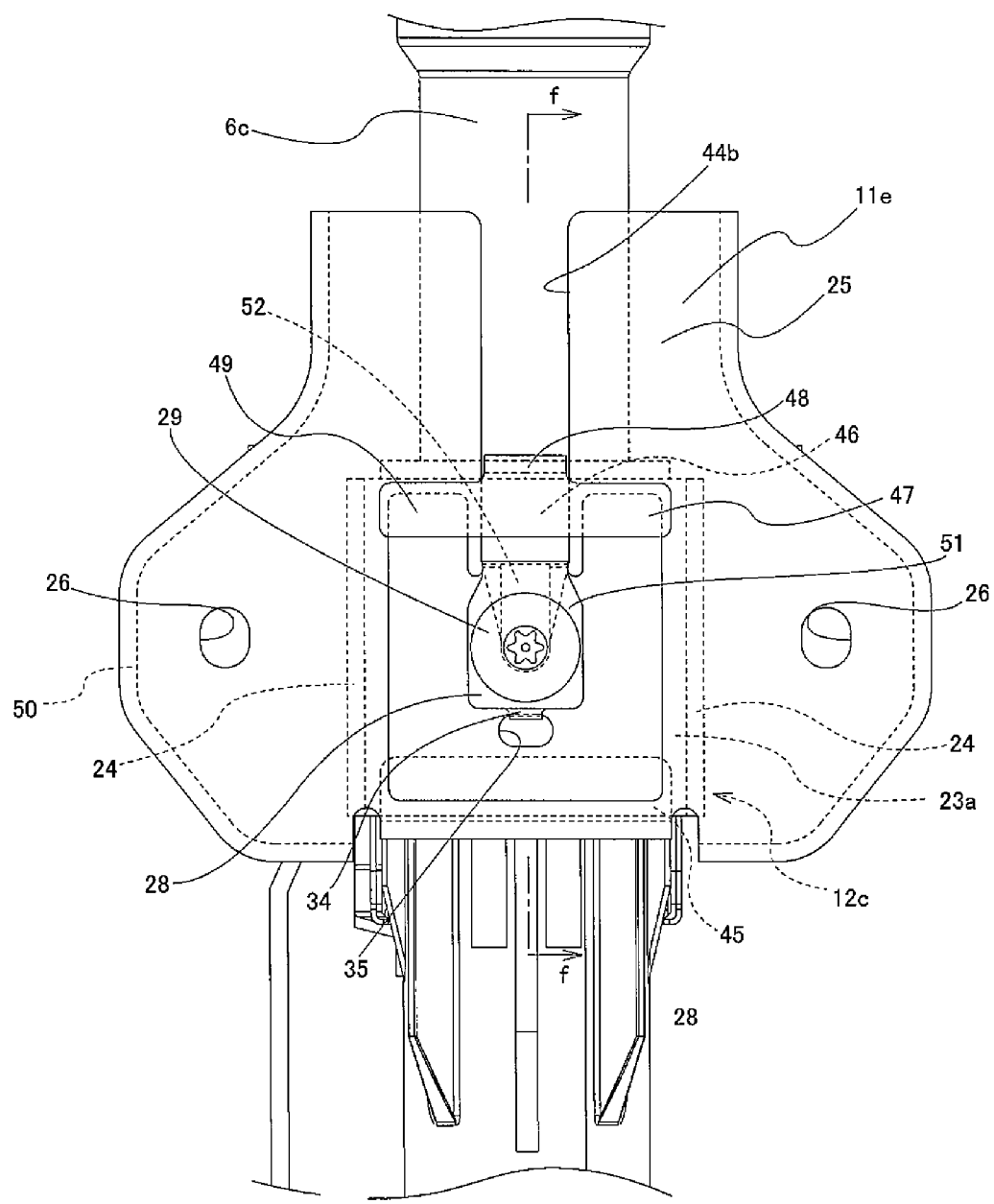
FIG. 20 illustrates a ninth example of the first embodiment of the present invention, and is a drawing similar to FIG. 3.
Figure 21:
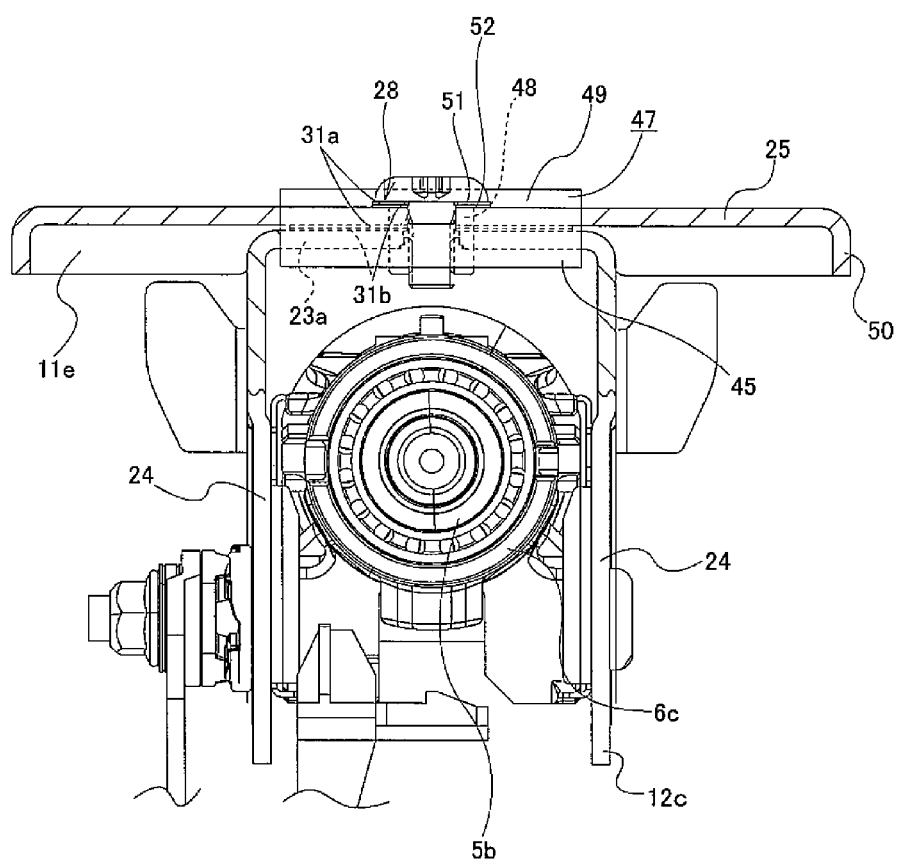
FIG. 21 is a drawing of the ninth example, and is similar to FIG. 4.
Figure 22:
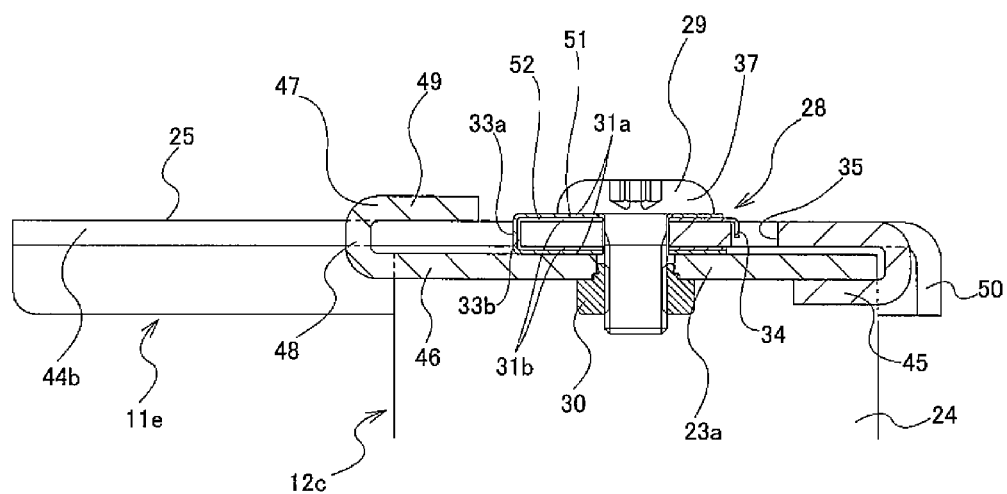
FIG. 22 is a cross-section view of section f-f in FIG. 20, and illustrates a state where part is omitted or transparent.
Figure 23:
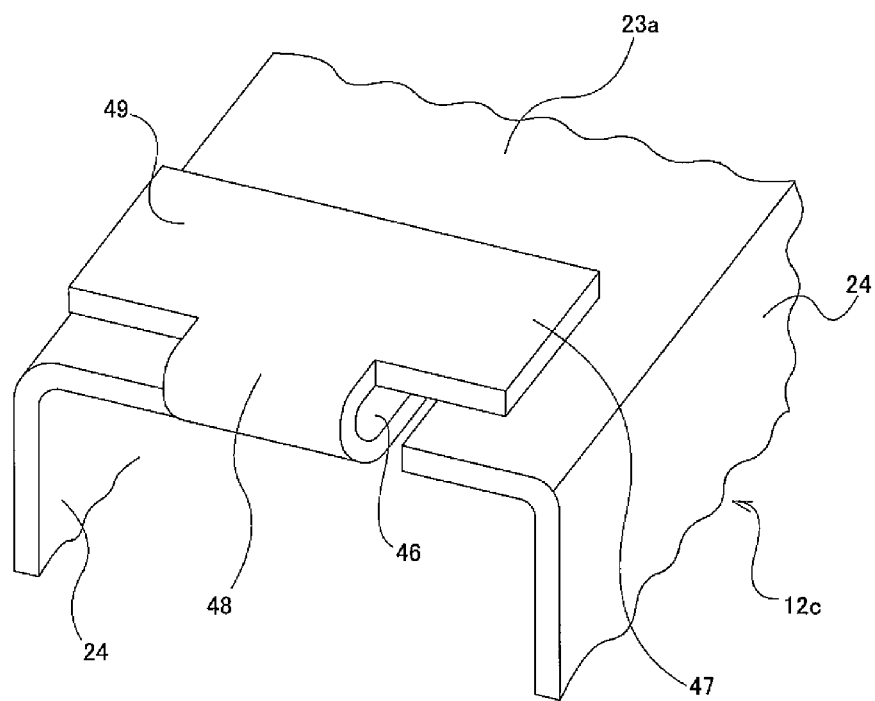
FIG. 23 is a perspective view of the front top section of a bracket on the column side that is used in the ninth example.

FIG. 19 illustrates an eighth example of the first embodiment of the present invention. In this example, the locking cutout section that is formed in the base plate section 25 of the bracket 11d on the vehicle side is a pair of locking notches 44a that are open in the portions on both sides from the center section in the width direction of the edge on the front end of the base plate section 25. By forming the locking cutout section as a pair of locking notches 44a that are open on the edge of the front end of the base plate section 25 in this way, it becomes easier to maintain the stroke of the bracket 12b on the column side with respect to the bracket 11d on the vehicle side during a secondary collision. In the normal state, a pair of left and right bolts 29 that connect the bracket 11d on the vehicle side and the bracket 12b on the column side are located on a line α that connects the center axes of the pair of through holes 26 that are formed on both the left and right end sections of the bracket 11d on the vehicle side. With this construction the support rigidity of the bracket 12b on the column side against a moment that is applied in the width direction of the steering column 6c is improved. The construction and function of the other parts are the same as in the first example, so drawings and explanations of identical parts are omitted.

[Embodiment 1, Example 9]

FIG. 20 to FIG. 23 illustrate a ninth example of the first embodiment of the present invention. In this example, the locking cutout section that is formed in the base plate section 25 of the bracket 11e on the vehicle side is a locking notch 44b that is open in the center section in the width direction of the edge on the front end of the base plate section 25. The planar shape of the rear end section of the locking notch 44b, as in the first example, is a V shape. A portion of the metal plate of the bracket 11e on the vehicle side that faces the edge on the rear end of the top plate section 23a of the bracket 12c on the column side is bent forward and downward such that the cross-sectional shape is U shape, and this bent section 45 on the bottom side that is formed in this way wraps around and hold the edge section on the rear end of the top plate section 23a. Moreover, an extending plate section 46 that extends in the forward direction from the edge section on the front end of the top plate section 23a is bent backward and upward to form a bent section 47 on the top side that has U-shaped cross section, and this bent section 47 holds the portions on both sides of the locking notch 44b in the middle section in the forward/backward direction of the base plate section 25 of the bracket 11e on the vehicle side. The extending plate section 46 comprises a base section 48 that has a width dimension that is less than the width dimension of the locking notch 44b, and a holding plate section 49 that is formed on the tip end section of the base section 48 and has a width dimension that is greater than the width dimension of the locking notch 44b. When the base section 48 is placed inside the locking notch 44b, the top surface of the base plate section 25 is held by the portion on both ends in the width direction of the holding plate section 49.

In the case of the construction of this example, together with the bent section 45 on the bottom side holding the edge section on the rear end of the top plate section 23a, the bent section 47 on the top side holds the top surface of the base plate section 25, so it is possible to improve the support rigidity of the bracket 12c on the column side with respect to the bracket 11e on the vehicle side. The bent section 45 on the bottom side also has the effect of increasing the force for suppressing displacement in the backward direction of the bracket 12c on the column side during a primary collision. In order to increase this support rigidity while keeping the break away load during a secondary collision low, preferably a low-friction member is placed in the portion between these bent section 45, 47 and the respective opposing surfaces. In that case, a sliding plate that is coated on one side or both sides with a coating layer made of a low-friction material, or a film made of a low-friction material can be held between these sections. The construction and function of other parts are the same as in the seventh example, so any redundant explanation is omitted.

[Embodiment 1, Example 10]

Figure 24:
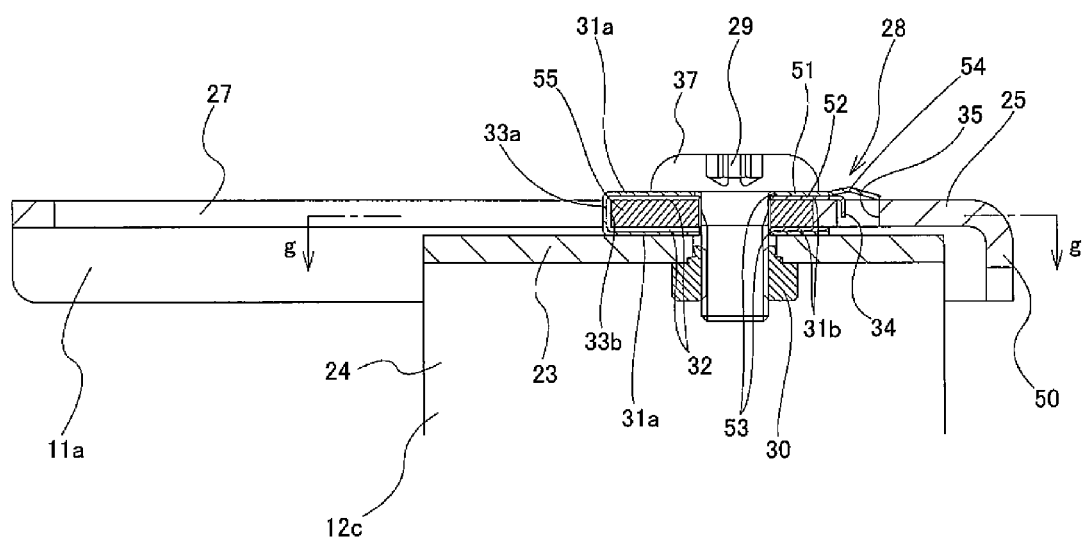
FIG. 24 illustrates a tenth example of the first embodiment of the present invention, and is a drawing similar to FIG. 5.
Figure 25:
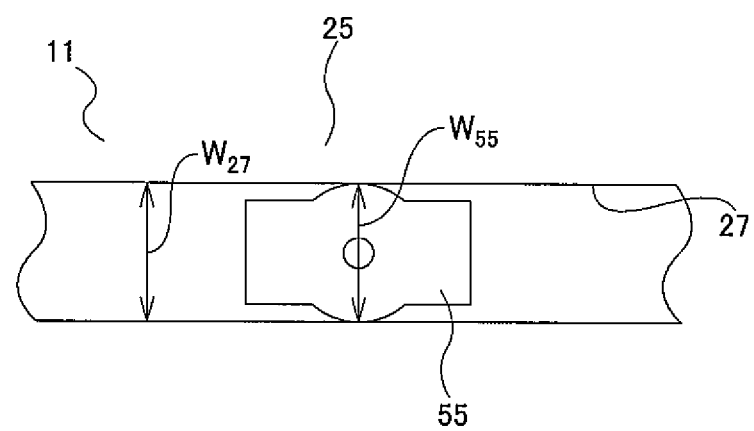
FIG. 25 is a cross-sectional view of section g-g in FIG. 24, and illustrates a state where part is omitted.

FIG. 24 and FIG. 25 illustrate a tenth example of the first embodiment of the present invention. In this example, a spacer 55 is placed in the rear end section inside the through hole 27, which is the locking cutout section. This spacer 55 is rectangular shaped and is made of a material that slides easily such as a copper alloy, a high functional resin, oil-containing metal or the like, or the rear end section is formed in to a V shape that follows the planar shape of the rear end section of the through hole 27, and has a thickness dimension that is equal to or less than the thickness dimension of the base plate section 25 of the bracket 11a on the vehicle side. Preferably, this spacer 55 has arc shaped convex sections that are formed on the edge sections of both sides, or both corner section on the front end are ¼ arc shapes so that during displacement in the forward direction during a secondary collision, the spacer 55 does not catch on the left and right inside edges of the through hole 27. In either case, the maximum width $W_{55}$ of the spacer 55 is equal to or less than the width $W_{27}$ of the through hole 27 ($W_{55} \leqq W_{27}$). This kind of spacer 55, when placed in the rear end section of the through hole 27 is held between the top and bottom sliding plate sections 31b of the inside sliding plate 52 of the sliding member 28. During a secondary collision, the spacer 55 displaces in the forward direction along the through hole 27, which makes it possible for the bracket 12b on the column side to displace smoothly in the forward direction. The construction and function of the other parts are the same as in the first example, so any redundant drawings and explanations are omitted.

[Embodiment 2]

FIG. 26 to FIG. 39 illustrate an example of a second embodiment of the present invention. In this example, the bracket 11f on the vehicle side is formed into a flat shape by performing punching using a press and cutting using a laser cutter of a metal plate raw material such as carbon steel plate that has sufficient strength and rigidity. However, instead of using a raw material having a small thickness dimension, it is possible to maintain rigidity by forming a bent section on the edge sections on both sides and on the edge section on the rear end as in the examples of the first embodiment.

In either case, the width dimensions of the bracket 11f on the vehicle side that is assembled in this example are such that the front half section is narrow and the rear end section is wide. A locking notch 56, which is a locking cutout section, is formed in the center section in the width direction of the bracket 11f on the vehicle side such that only the center section of the edge on the front end of the bracket 11f on the vehicle side is open. The length dimension in the forward/backward direction of this locking notch 56 is sufficiently long, so that after a secondary collision has advanced, or in other words, after the steering wheel can no longer displace any further in the forward direction due to the impact energy during a secondary collision, the support force for supporting the bracket 12d on the column side by the bracket 11f on the vehicle side is not lost. In this example as well, instead of a locking notch 56 as the locking cutout section, it is possible to form a through hole that is not open on the edge of the front end of the base plate section of the bracket on the vehicle side.

In this second embodiment, the bracket 12d on the column side employs construction as described below in order to be supported by the bracket 11f on the vehicle side so that the bracket 12d on the column side can break away in the forward direction due to an impact load that is applied during a secondary collision. In other words, of the construction (1) to (3) below, the construction of (3) is combined with the construction of at least one of construction (1) and (2), or a combination of all of the construction (1) to (3) is employed. In this example, construction that is a combination of all of the construction (1) to (3) below is employed.

(1) A pressure plate section 57 on the bottom side is formed by bending downward the edge on at least the tip end thereof in the center section in the width direction of the edge on the rear end of the locking notch 56, which is the locking cutout section of the bracket 11f on the vehicle side, and the pressure plate section 57 on the bottom side presses the bottom surface in the center section in the width direction of the top plate section 23b of the bracket 12d on the column side upward, and presses the top surface of the top plate section 23b against the bottom surface of the bracket 11f on the vehicle side.

(2) A pressure plate section 58 on the top side is formed by bending the edge on the tip end thereof in the center section in the width direction of the portion (rear half section) other than the front section of the top plate section 23b upward and toward the rear, and this pressure plate section 58 on the top side presses the top surface of the center section in the width direction of the bracket 11f on the vehicle side downward, and presses the bottom surface of the bracket 11f on the vehicle side against the top surface of the top plate section 23b of the bracket 11f on the vehicle side.

(3) A restraining plate 59 that spans between the portions on both the left and right sides of the locking notch 56, which is the locking cutout section, is provided on the top surface of the bracket 11f on the vehicle side, and by joining this restraining plate 59 and the top plate section 23b of the bracket 12d on the column side by fastening members such as a bolt 60 and nut 61, the portions of the bracket 11f on the vehicle side on both the left and right sides of the locking notch 56 are held between the restraining plate 59 and the top plate section 23b.

First, construction (1) will be explained with reference to FIG. 26 to FIG. 32. In this construction (1), the edge of the base end section of the pressure plate section 57 on the bottom side is continuous with the center section in the width direction of the edge on the rear end of the locking notch 56 in the center section in the width direction of the rear end of the bracket 11f on the vehicle side. This pressure plate section 57 on the bottom side is obtained by bending a free protruding plate section that is formed from leaving the portion of the metal plate of the bracket 11f on the vehicle side that is located on the rear end section of the locking notch 56 and that is not connected with other portions of the edge on the front end. In other words, the base end section (rear end section) of this protruding plate section is bent downward at a right angle with respect to the main portion of the bracket 11f on the vehicle side to form a connecting plate section 62 on the bottom side. Furthermore, the portion near the base end in the middle section of the protruding plate is bent at a right angle with respect to the connecting plate section 62 on the bottom side in a direction toward the front, and the middle section to the tip end section of the protruding plate section becomes an elastic pressure plate section 63 on the bottom side and is parallel with the main portion of the bracket 11f on the vehicle side.

The top surface on the tip end section of this elastic pressure plate section 63 on the bottom side is elastically pressed against the bottom surface in the center section in the width direction of the top plate section 23b of the bracket 12d on the column side by way of part of the sliding plate 64, which is a sliding member. Both end sections in the width direction of the top plate section 23b are elastically pressed toward the bottom surface of the portions of the bracket 11f on the vehicle side that are located on the left and right sides of the locking notch 56, and the middle section in the forward/backward direction of the bracket 12d on the column side is supported by the bracket 11f on the vehicle side so as to be able to break away in the forward direction due to an impact load that is applied during a secondary collision.

Next, construction (2) will be explained with referent to FIG. 26 to FIG. 28 and FIG. 33 to FIG. 36. In this construction (2) a pressure plate section 58 on the top side is formed on rear half section of the center section in the width direction of the top plate section of the bracket 12d on the column side by bending the edge of the tip end upward and toward the rear. In this example, slit-like notches 65 that are parallel with other and that are open on the edge of the rear end of the top plate 23d are formed at two locations separated from each other in the width direction on the portion toward the center section of the top plate section 23d. The base end section (front end section) of the rectangular plate section that is surrounded on both sides in the width direction by these notches 65 is bent upward at a right angle with respect to the main portion of the top plate section 23d to form a connecting plate section 66 on the top side. Furthermore, the portion near the base end in the middle section of the rectangular plate is bent toward that rear at a right angle with respect to this connecting plate section 66 on the top side, and from the middle section to the tip end section of the rectangular plate section forms an elastic pressure plate section 67 on the top side that is parallel with the main portion of the top plate section 23b.

Next, the bottom surface of the tip end section of the elastic pressure plate 67 section on the top side is elastically brought into contact with the top surface of the center section in the width direction of the rear end section of the main portion of the bracket 11f on the vehicle side. In this example, the tip end section (rear end section) of the elastic pressure plate 67 on the top side is crimped and deformed downward a little, and this deformed section is pressed against the top surface of part of the bracket 11f on the vehicle side by way of a sliding plate 64. The elastic pressure plate 67 on the top side elastically presses the rear end section of the bracket 11f on the vehicle side toward the top surface at two locations in the width direction on both sides of the notches 65 of the top plate section 23d of the bracket 12d on the column side, and supports the rear end section of the bracket 12d on the column side with respect to the bracket 11f on the vehicle side so that the bracket 12d on the column side can break away in the forward direction due to an impact load that is applied during a secondary collision. Both the pressure plate section 57 on the bottom side and the pressure plate section 58 on the top side of construction (1) and (2) are located in the center section in the width direction of the bracket 11f on the vehicle side and the bracket 12d on the vehicle side, such that the centers of each in the width direction coincide.

Furthermore, construction (3) will be explained with reference to FIG. 26 to FIG. 28. A restraining plate 59 is placed on the top surface of the bracket 11f on the vehicle side so that it spans between the portions on both sides of the locking notch 56. This restraining plate 59 is preferably made of a material having spring-like characteristic such as stainless spring steel plate, galvanized steel plate, phosphor copper bronze sheet, and/or a rustproof material which is never rusted in the relations with the sliding plates 64 with which the bottom surfaces on both end sections of the restraining plate 59 come in contact. The nut 61 that is screwed onto the tip end section (top end section) of the bolt 60 that is inserted from the bottom through the through hole that is formed in the center section in the width direction of the front half section of the top plate section 23b of the bracket 12d on the column side and the locking notch 56, presses down the top surface of the center section in the width direction of the restraining plate 59 by way of a washer 68. The bottom surface on both end sections in the width direction of this restraining plate 59 elastically comes in contact with the portion of the top surface of the bracket 11f on the vehicle side on both sides of the locking notch 56 by way of the other portion of the sliding plate 64 as will be described later.

In each connecting construction that is obtained by the construction (1) to (3) above, displacement of the bracket 12d on the column side with respect to the bracket 11f on the vehicle side is prevented during normal operation by friction force, and during a secondary collision the bracket 12d on the column side can displace in the forward direction against the friction force. Preferably, in order that forward displacement of the bracket 12d on the column side and the steering wheel 1 that is supported by the bracket 12d on the column side is performed smoothly at the instant that a secondary collision occurs, this friction force (static friction force) is kept low. However, in order to keep this friction force low, lowering the contact pressure of the contact surfaces in the construction obtained from (1) to (3) above cannot be employed because the support rigidity of the bracket 12d on the column side with respect to the bracket 11f on the vehicle side will decrease, which will lower the operational feeling of the steering wheel 1. Therefore, in this example, a sliding plate 64, which is a sliding member, is placed in the connection construction that is obtained from the construction (1) to (3), and this sliding plate 64 keeps the friction force low.

The sliding plate 64, which is a sliding member, is obtained by bending metal thin plate such as stainless steel plate. One surface of this metal plate is coated with a coating layer made of a low-friction material such as polytetrafluoroethylene resin, polyamide resin, molybdenum disulfide and the like. The shape of this sliding plate 64 will be explained with reference to FIG. 37 to FIG. 40. This sliding plate 64 comprises a connecting plate section 69 that is formed on the rear end section, and a top plate section 70 and bottom plate section 71 that are bent at right angles extending toward the front from the edges on both the top and bottom of the connecting plate section 69 and function as sliding plates. A coating layer exists on the rear surface of the connecting plate section 69, the top surface of the top plate section 70 and the bottom surface of the bottom plate section 71.

A notch that is open toward the front is formed in the top plate section 70 such when assembled in the steering column support apparatus, the notch is aligned with the locking notch 56 of the bracket 11f on the vehicle side. Therefore, this top plate section 70, except for the portion on the rear end section, is fork shaped. On the other hand, a notch that is open toward the front is also formed in the bottom plate section 71 in the portion that is aligned with the locking notch 56, and except for the rear end section, has a fork shape. However, in the case of this bottom plate section 71, a protruding plate section 72 that protrudes in the forward direction is formed in the center section in the width direction of the rear end section of the notch, in the portion that is located above the pressure plate section 57 on the top side when assembled in the steering column support apparatus. Moreover, a bent back section 73 that is tightly bent back 180 degrees is formed on the tip end section (front end section) of the protruding plate section 72 such that the surface that is not coated with a coating layer is on the inside, and the tip end section of the protruding section is on the top side. Therefore, the tip end section of the protruding plate section 72 has a coating layer on not only the bottom surface, but on the top surface as well.

Figure 26:
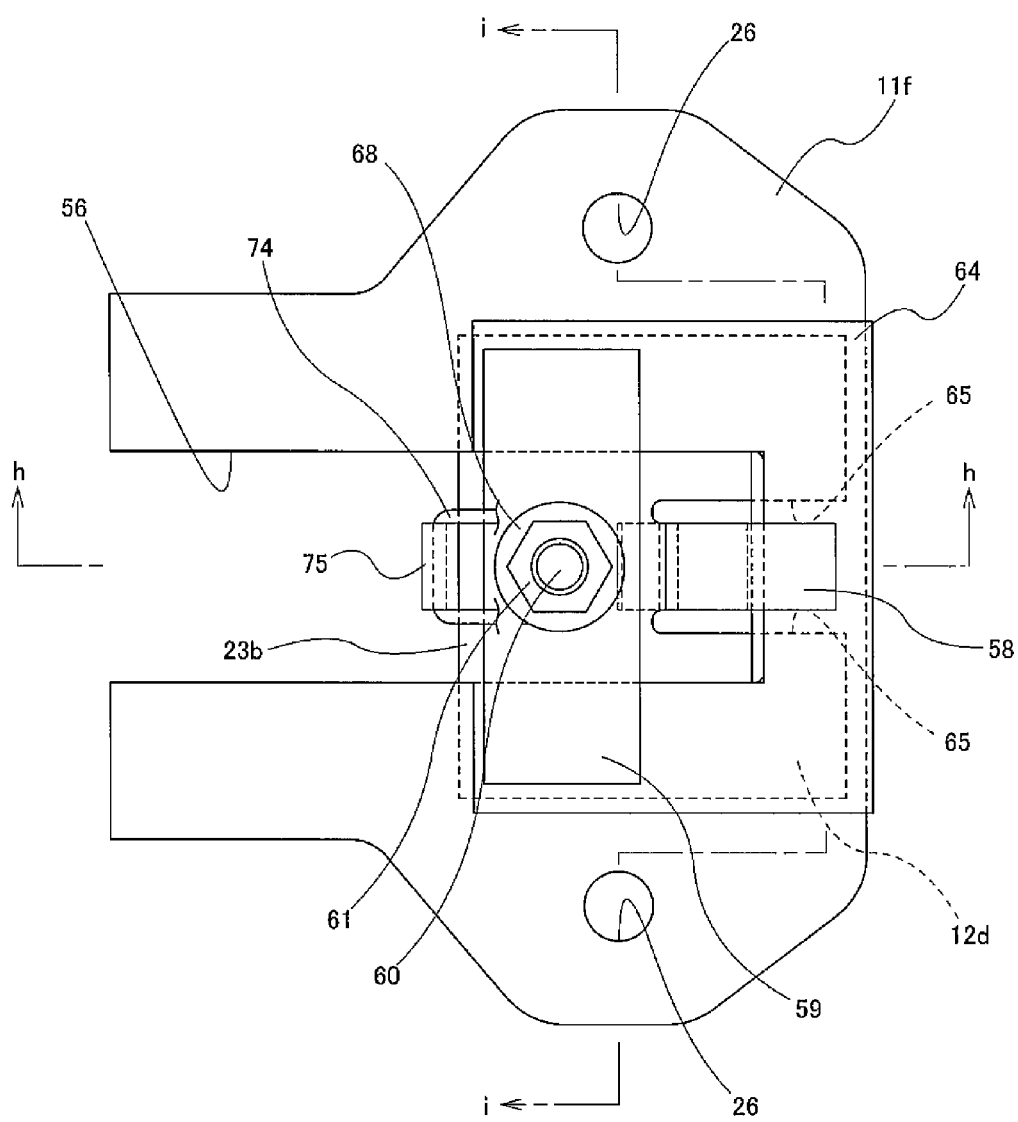
FIG. 26 is a top view that illustrates the major parts of a first example of a second embodiment of the present invention.
Figure 27:
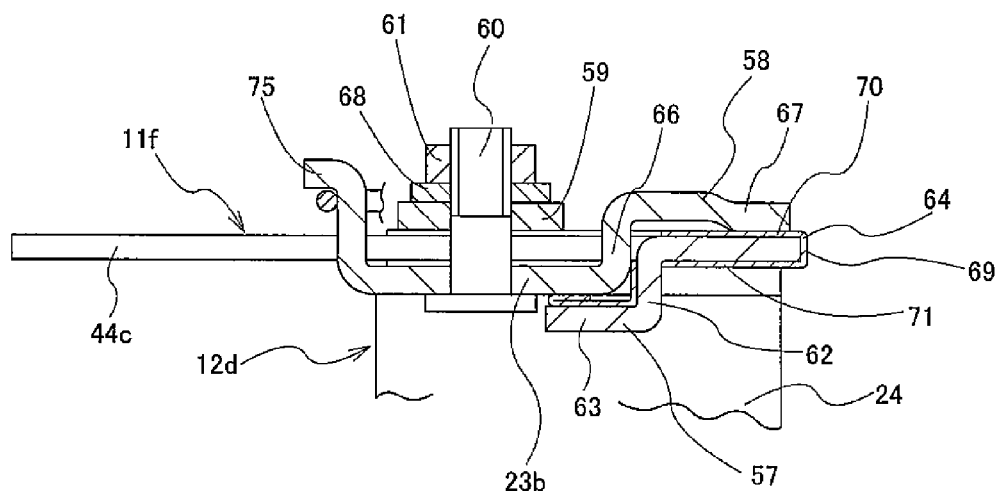
FIG. 27 is a cross-sectional view of section h-h in FIG. 26.
Figure 28:
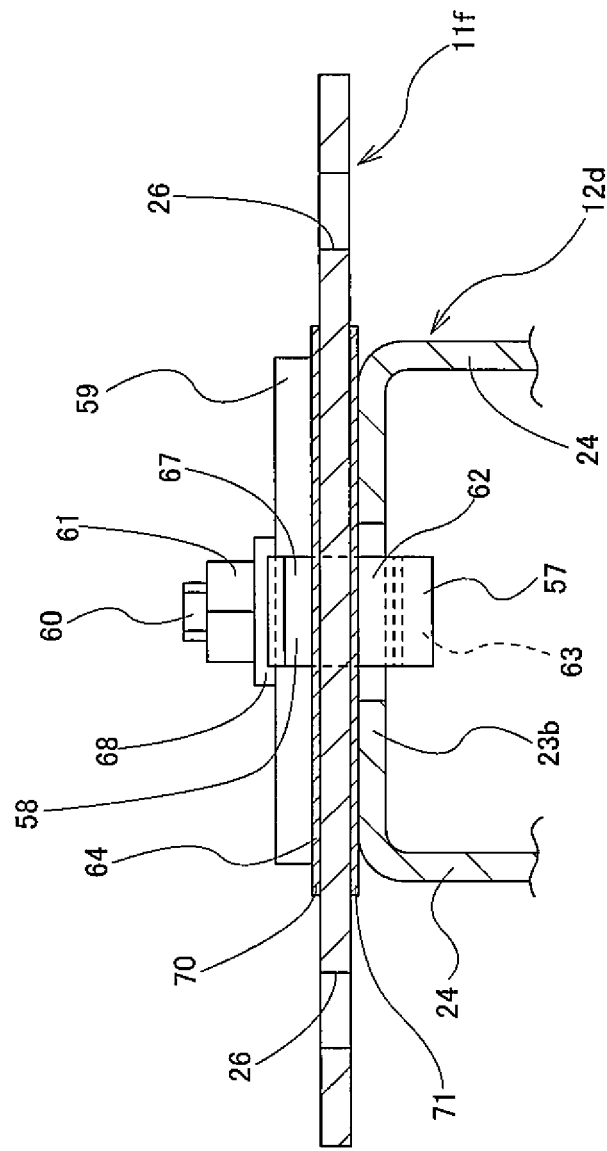
FIG. 28 is a cross-sectional view of section i-i in FIG. 26.
Figure 29:
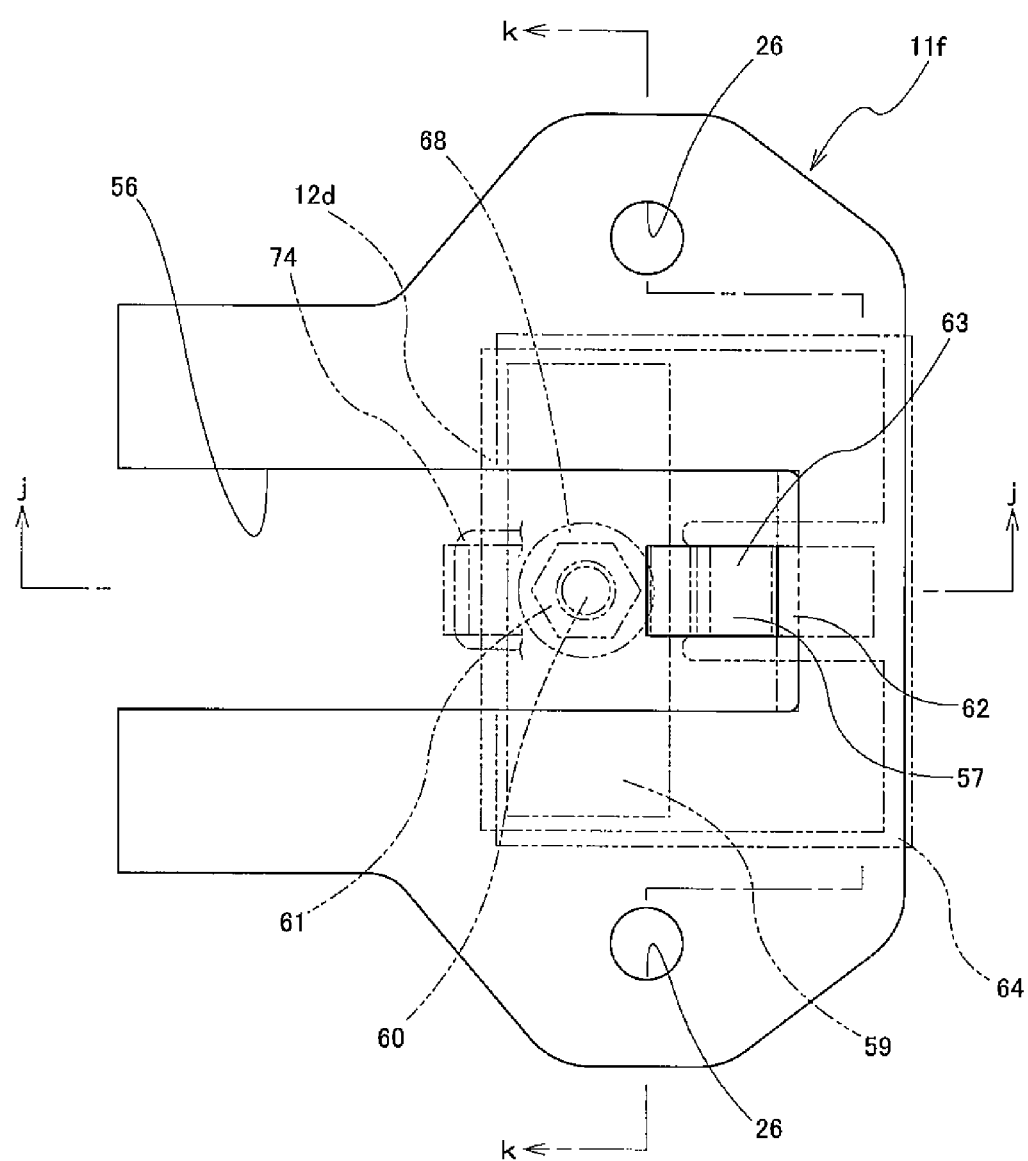
FIG. 29 is a top view of a bracket on the vehicle side that is the second embodiment.
Figure 30:
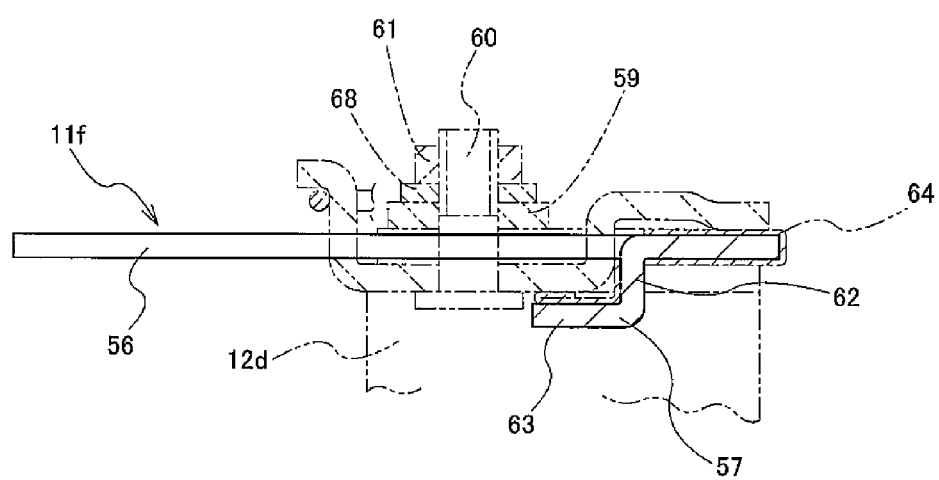
FIG. 30 is a cross-sectional view of section j-j in FIG. 29.
Figure 31:
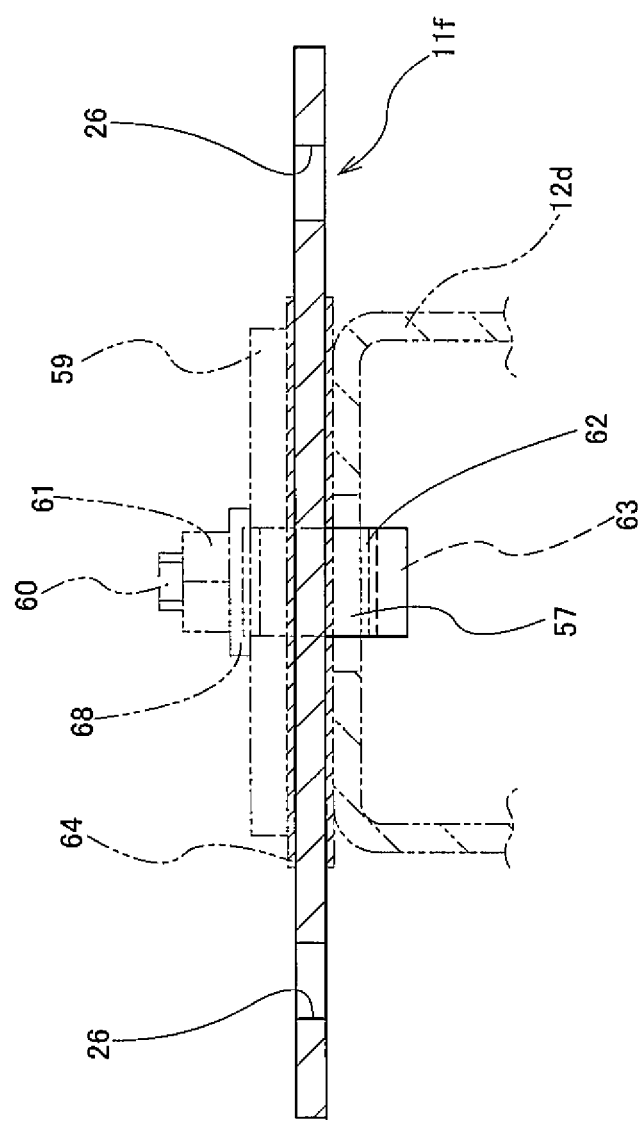
FIG. 31 is a cross-sectional view of section k-k in FIG. 29.

As illustrated in FIG. 26 to FIG. 28, when this sliding plate 64 is assembled in the steering column support apparatus, the front end section of the top plate section 70 is held between the top surface of the bracket 11f on the vehicle side and the bottom surface on both end sections of the restraining plate 59. In this state, the coating layer comes in contact with the bottom surface on both end sections of the restraining plate 59. On the other hand, the portion of the bottom plate section 71 other than the protruding plate section is held between the bottom surface of the bracket 11f on the vehicle side and the top surface of the top plate section 23b of the bracket 12d on the column side. In this state, the coating layer comes in contact with the top surface of the top plate section 23b. Furthermore, the bent back section 73 that is formed on the tip end section of the protruding plate section 72 is held between the bottom surface of the top plate section 23b and the top surface of the pressure plate section 57 on the bottom side that is formed on the bracket 11f on the vehicle side. In this state, the coating layer comes in contact with not only the top surface of the pressure plate section 57 on the bottom side, but also the bottom surface of the top plate section 23b.

Figure 32:
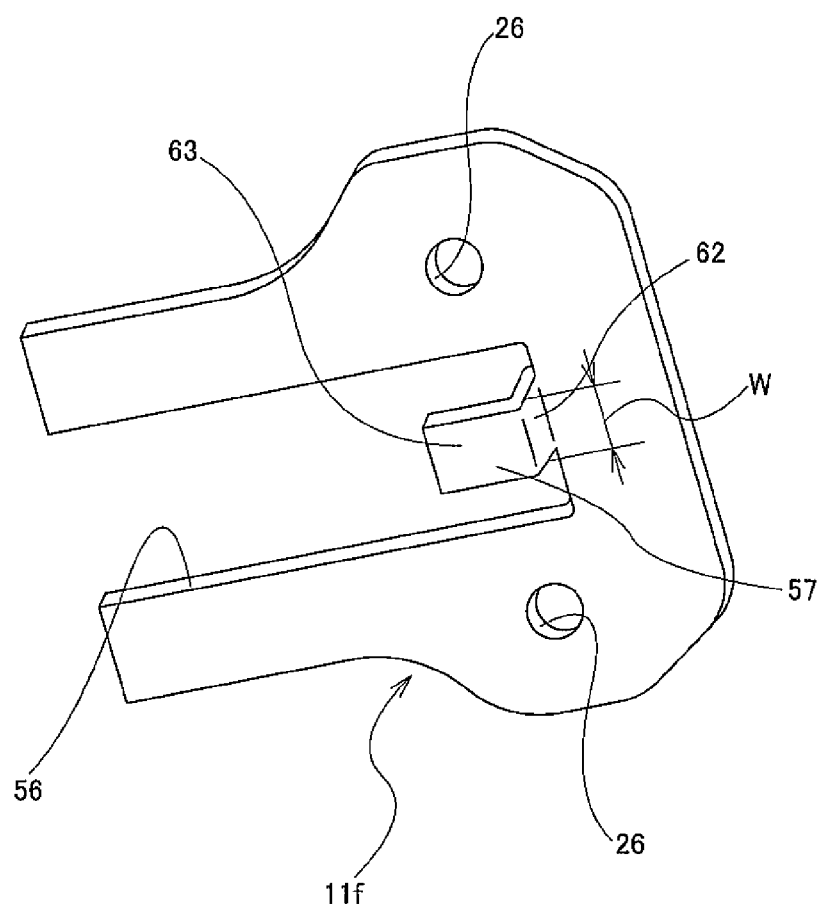
FIG. 32 is a perspective view illustrating the bracket on the vehicle side that is used in the second embodiment, and illustrates the state as seen from underneath in the rear.
Figure 33:
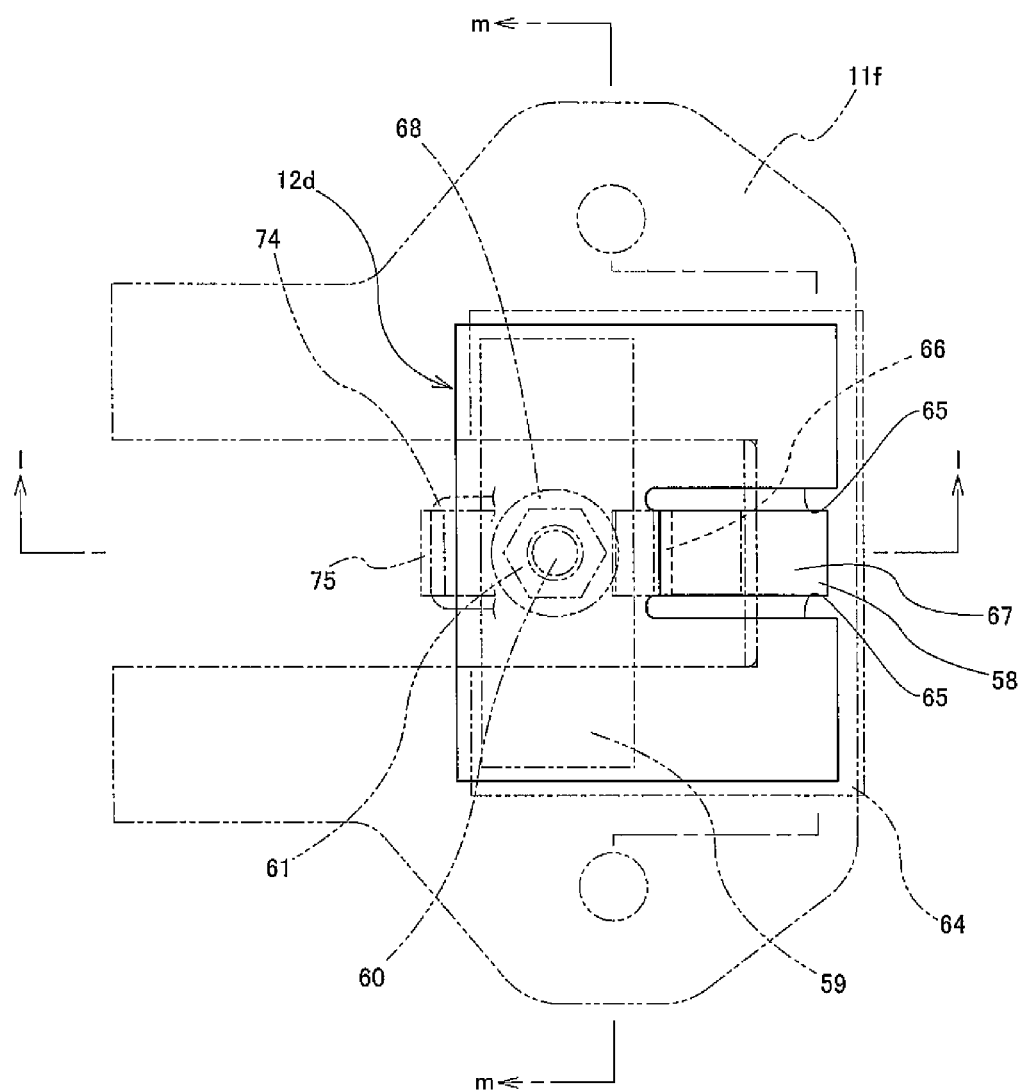
FIG. 33 is a top view of the bracket on the column side that is used in the second embodiment.
Figure 34:
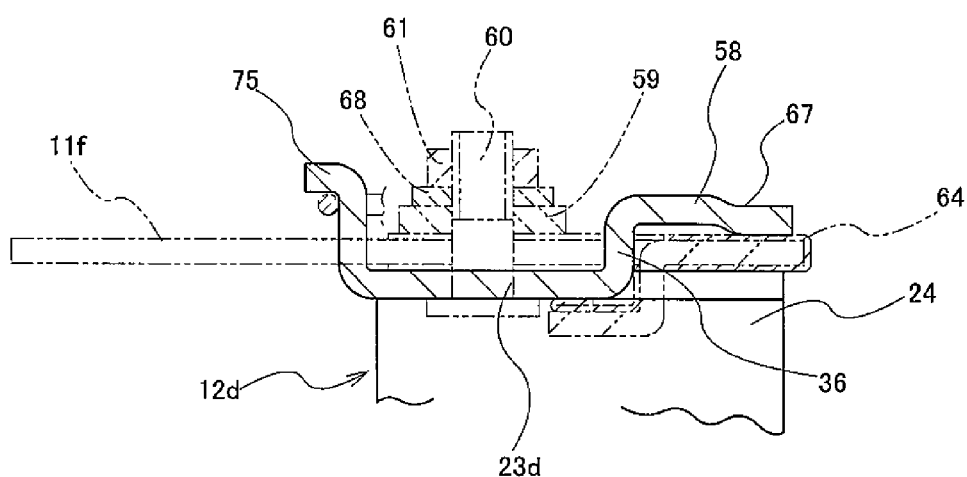
FIG. 34 is a cross-sectional view of section l-l in FIG. 33.
Figure 35:
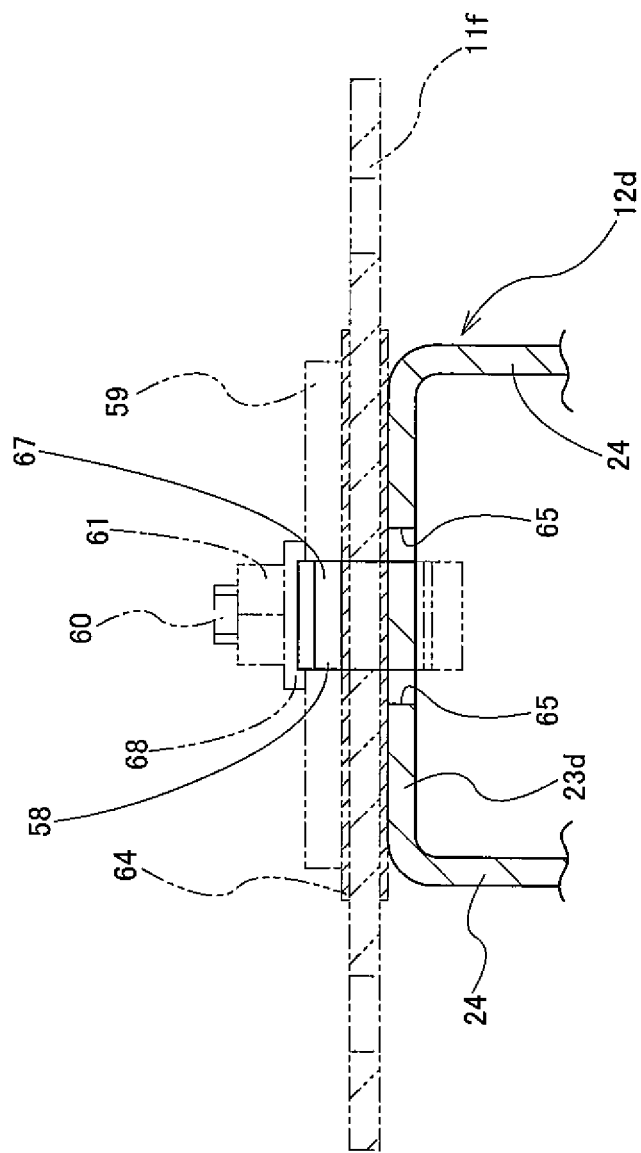
FIG. 35 is a cross-sectional view of section m-m in FIG. 33.
Figure 36:
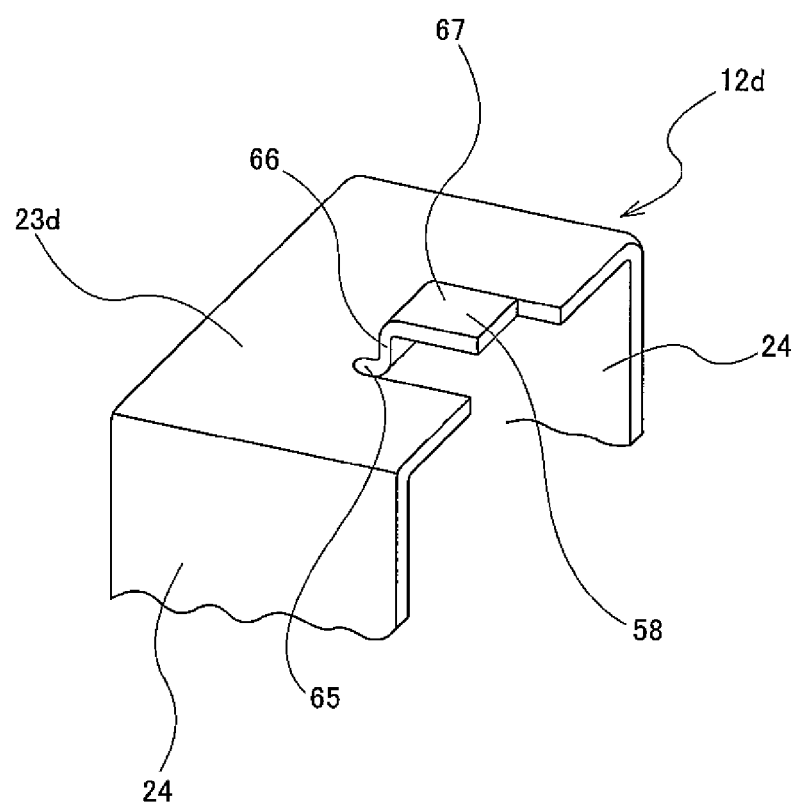
FIG. 36 is a perspective view of the bracket on the column side that is used in the second embodiment, and illustrates the state as seen from above in the rear.
Figure 37:
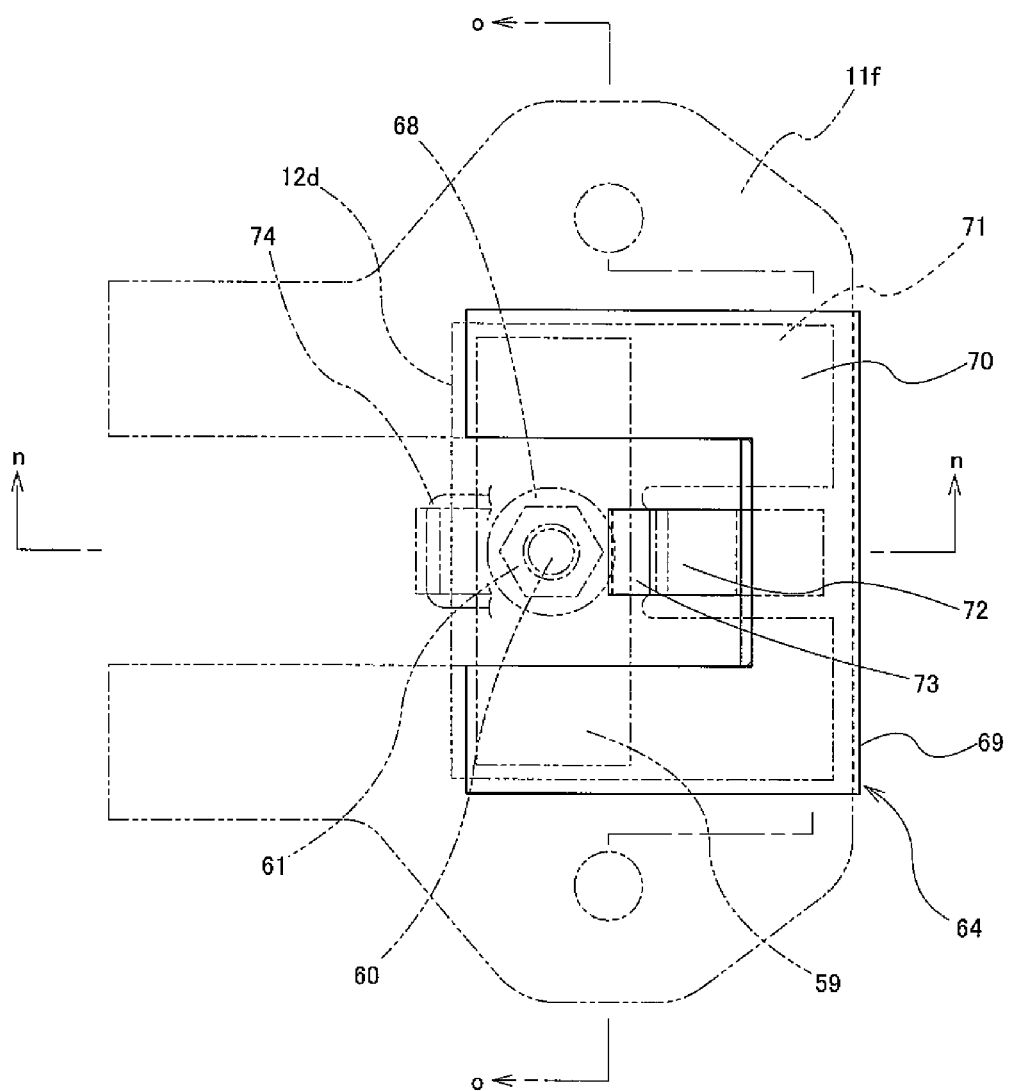
FIG. 37 is a top view of a sliding plate that is used in the second embodiment.
Figure 38:
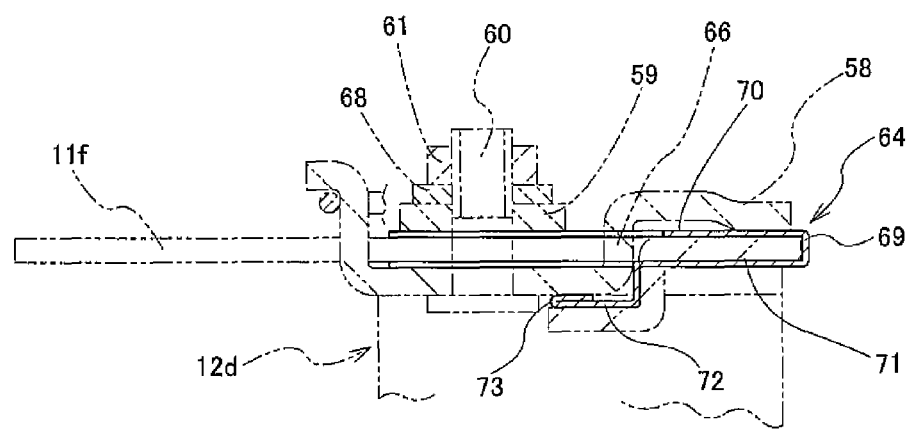
FIG. 38 is a cross-sectional view of section n-n in FIG. 37.
Figure 39:
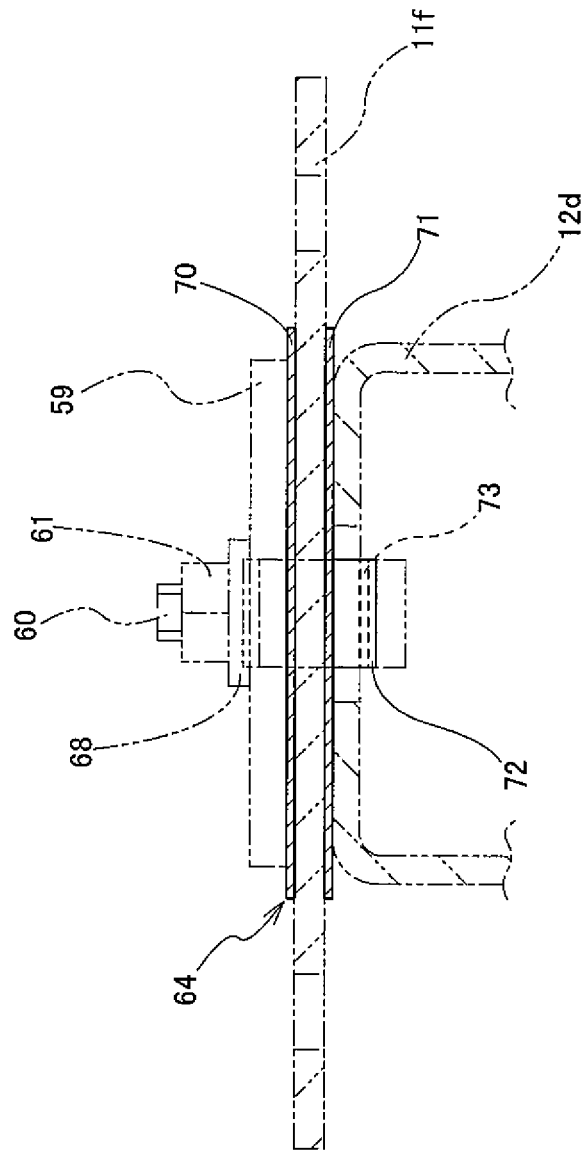
FIG. 39 is a cross-sectional view of section o-o in FIG. 37.
Figure 41:
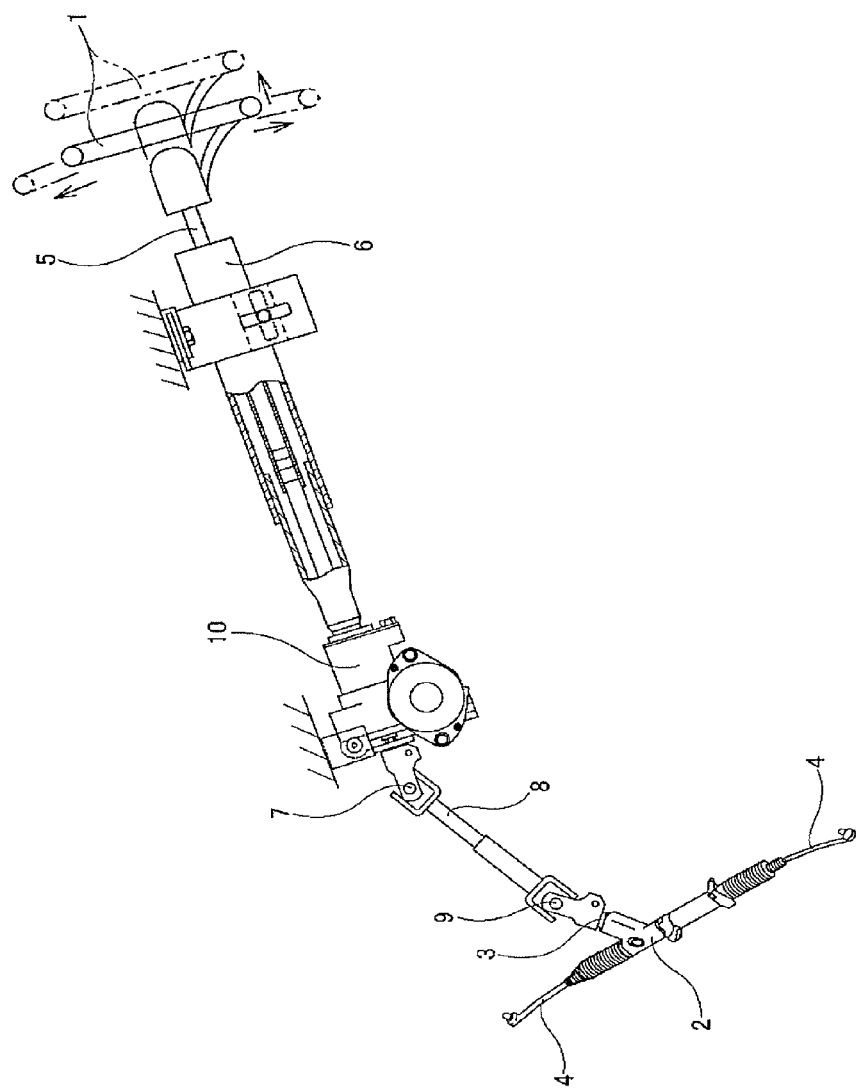
FIG. 41 is a partial cross-sectional side view illustrating an example of a conventionally known steering apparatus.
Figure 42:
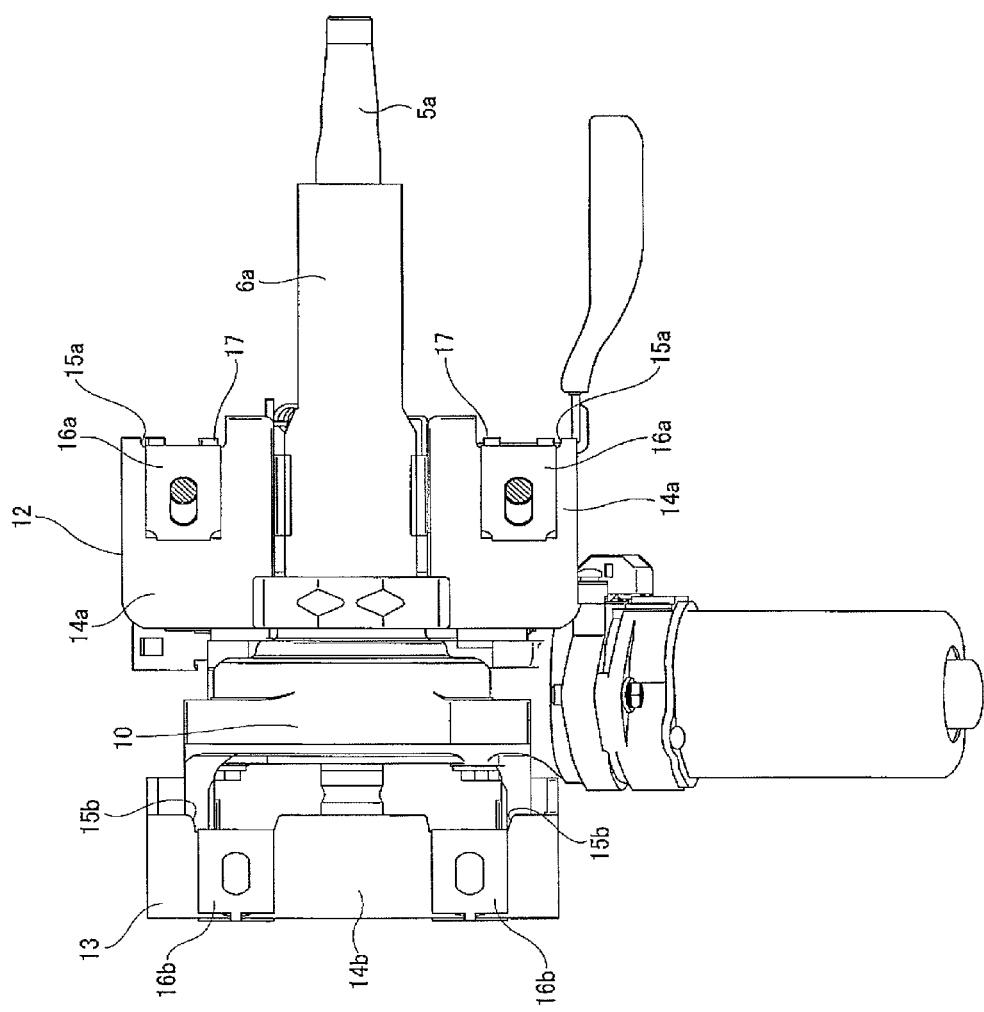
FIG. 42 is a top view that illustrates a conventional steering column support apparatus in the normal state.
Figure 43:
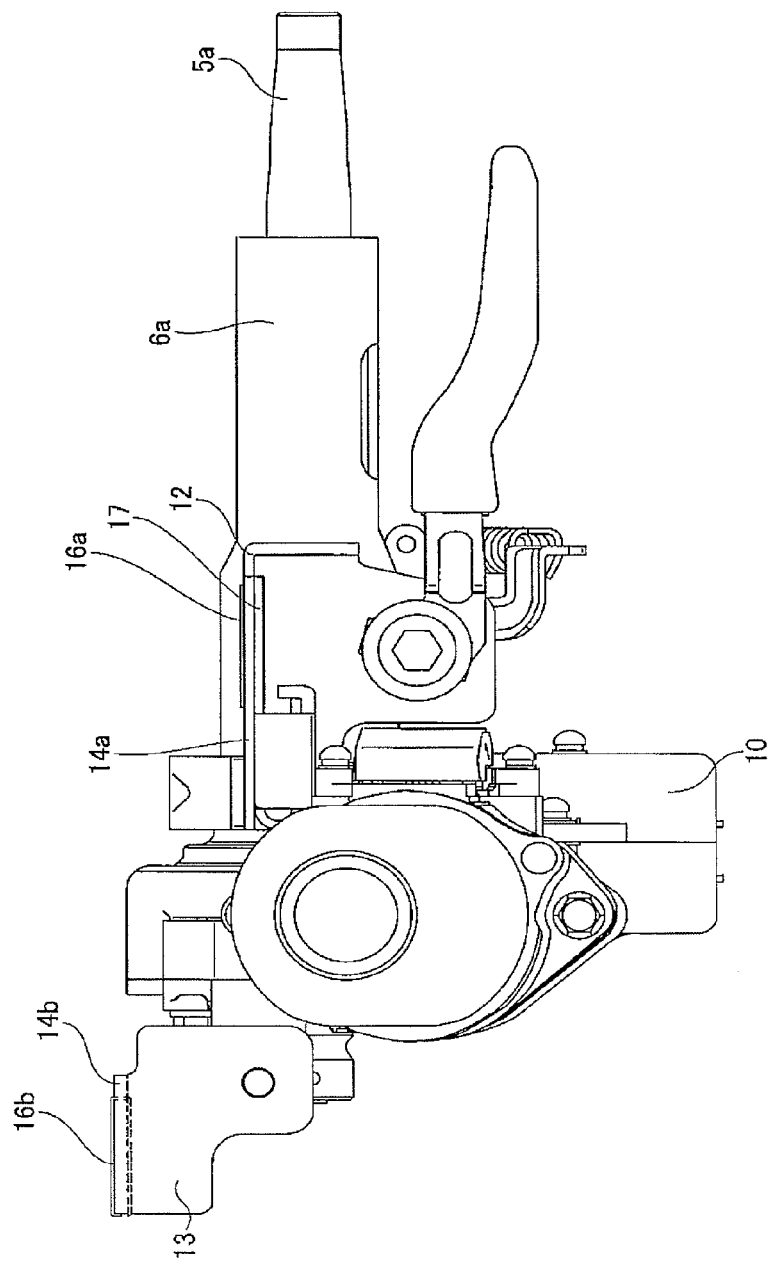
FIG. 43 is a side view of the apparatus in FIG. 42.
Figure 44:
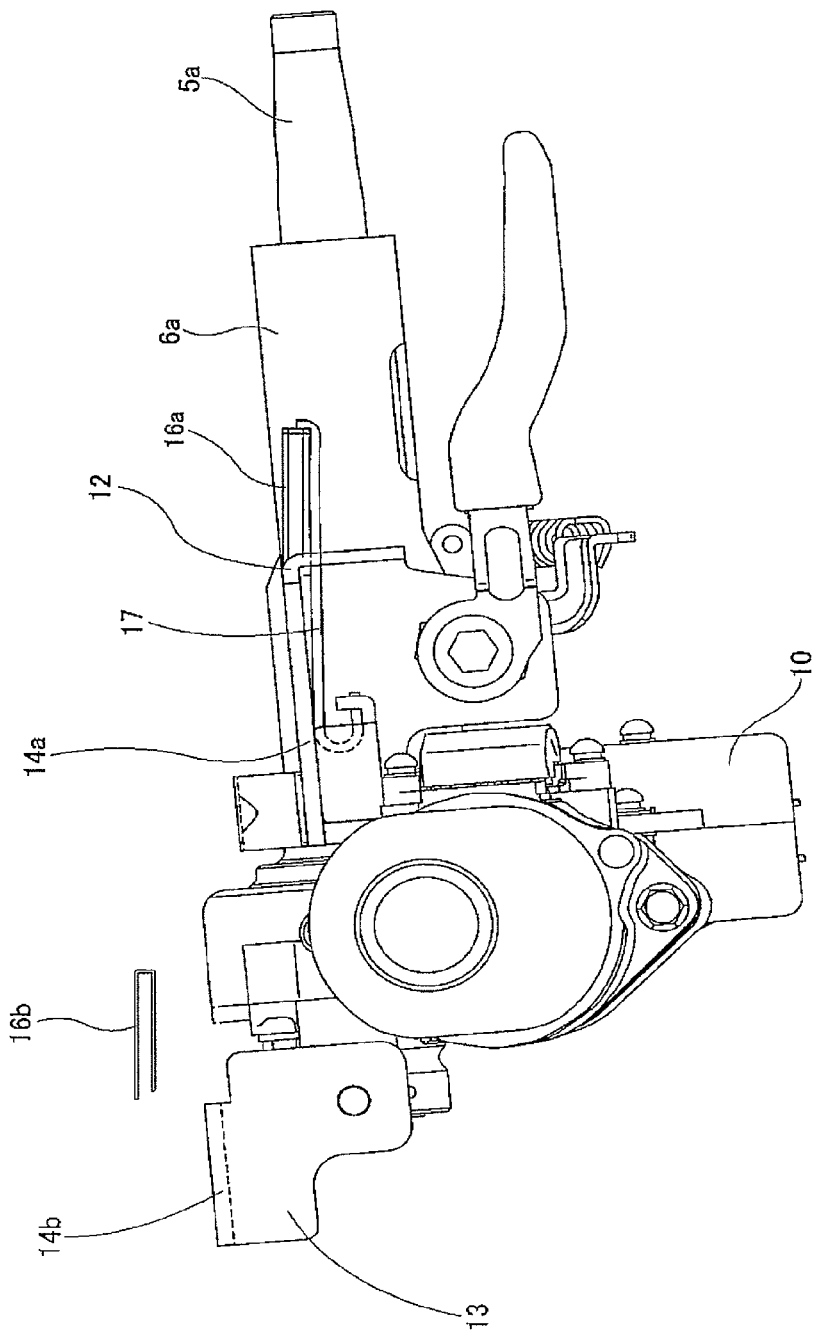
FIG. 44 is a side view of the apparatus in FIG. 42, and illustrates that state wherein the steering column has displaced in the forward direction due to a secondary collision.
Figure 45:
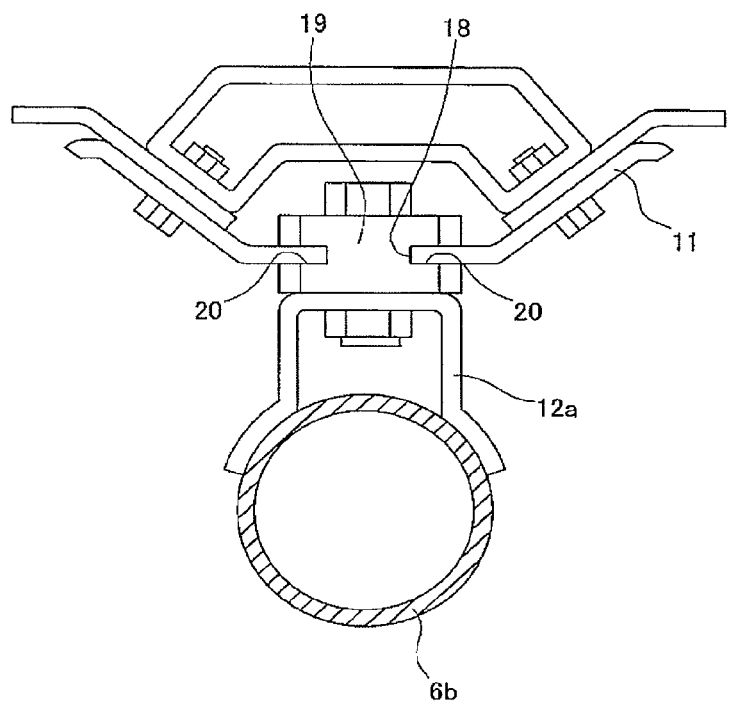
FIG. 45 illustrates an example of conventional construction, and is a cross-sectional view of a virtual plane that exists in a direction that is orthogonal to the center axis of the steering column.
Figure 46:
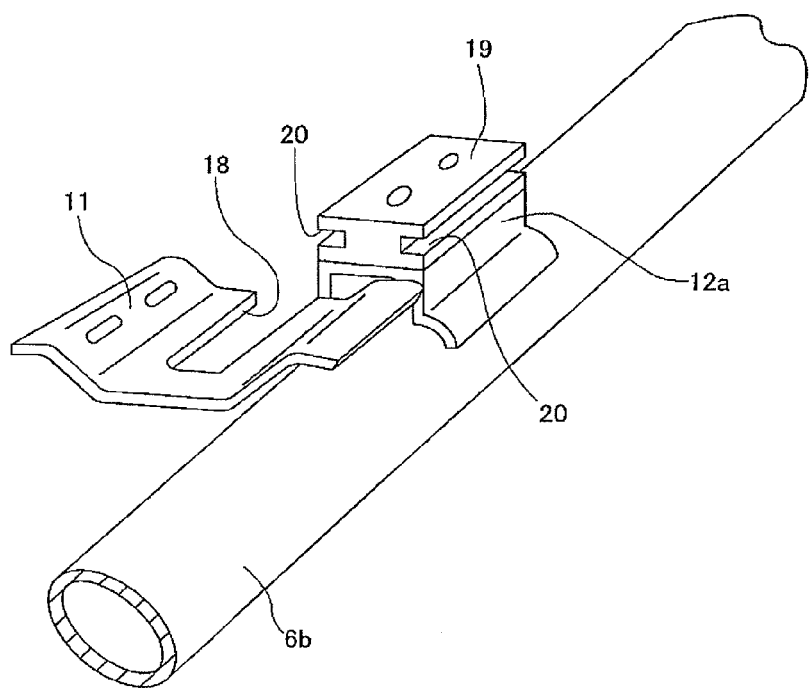
FIG. 46 is a perspective view of the construction in FIG. 45, and illustrates the state before the bracket on the vehicle side is connected with the bracket on the column.
Figure 47:
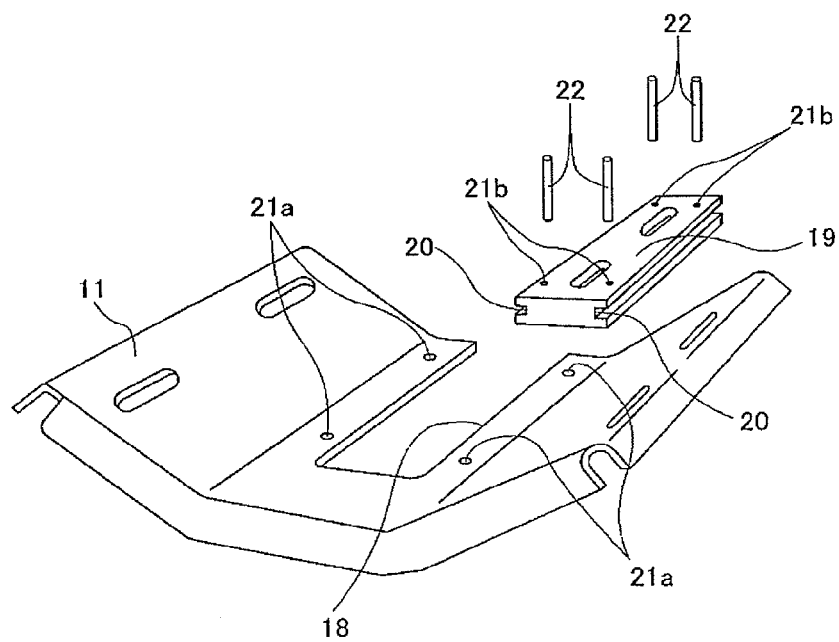
FIG. 47 is a perspective view of the construction in FIG. 45, and illustrates the fastening pins, with the steering column omitted.

In order to install the sliding plate 64 as described above, as illustrated in FIG. 40B, the space D between the edge on one side of the protruding plate section 72 and the edge on the inside of the notch that is formed in the bottom plate section 73 is equal to or greater than the width W of the base section of the connecting plate section 62 of the pressure plate section 57 on the bottom side illustrated in FIG. 32 (D≧W), such that the pressure plate section 57 on the bottom side can move farther into the notch that is formed in the bottom plate section 71 as illustrated in FIG. 26 and FIG. 27. As illustrated in FIG. 26 to FIG. 28, when assembled in the steering column support apparatus, the sliding plate 64 is prevented from displacing in the forward direction by the engagement between the edge on the rear end of the bracket 11*f* on the vehicle side and the connecting plate section 69. In other words, in this example, during a secondary collision, the sliding plate 64 stays as is in that position. However, there is a coating layer on all of the areas of contact between the bracket 12*d* on the column side and the restraining plate 59 that displace in the forward direction during a secondary collision, and the sliding plate 64. Therefore, it is possible to reduce and stabilize the break away load that is required for the bracket 12*d* on the column side to displace in the forward direction during a secondary collision.

In this example as well, in order to sufficiently absorb impact that is applied to the body of the driver that collides with the steering wheel 1, an energy absorbing member 74, which allows the bracket 12*d* on the column side to displace in the forward direction by plastically deforming, is provided between the bracket 12*d* on the column side and the bracket 11*f* on the vehicle side or a portion that is fastened to the vehicle body that does not displace in the forward direction during a secondary collision. In order for this, an engagement section 75 on the displacement side is formed in the center section in the width direction of the edge on the front end of the top plate section 23*b* of the bracket 12*d* on the column side by bending the metal plate of the bracket 12*d* on the column side upward. The energy absorbing member 74 is provided between the engagement section 75 on the displacement side and the bracket 11*f* on the vehicle side so that by plastically deforming in the extending direction, the energy absorbing member absorbs impact energy that is applied to the bracket 12*d* on the column side during a secondary collision. The construction for fastening the energy absorbing member 74 to the vehicle side such as to the bracket 11*f* on the vehicle side is known, so an explanation is omitted. Moreover, the construction of the energy absorbing member is not limited to that illustrated in the figures, and can be provided between the steering column or a portion that displaces in the forward direction together with the steering column and the bracket on the vehicle side or a portion that is fastened to the vehicle side, and an arbitrary energy absorbing member that is constructed so as to be able to absorb an impact load by plastically deforming can be used.

When assembling the steering column support apparatus of this second embodiment, first, the pressure plate section 57 on bottom side presses the bottom surface in the center section in the width direction of the top plate section 23*b* of the bracket 12*d* on the column side upward, and/or the pressure plate section 58 on the top side presses the top surface in the center section in the width direction of the bracket 11*f* on the vehicle side downward. As a result, the bracket 11*f* on the vehicle side and the bracket 12*d* on the column side are pressed toward each other in the up/down direction such that the top plate section 23*b* of the bracket 12*d* on the column side is connected to and supported by the bracket 11*f* on the vehicle side. In this state, the restraining plate 59 has not yet been installed. Therefore, in this state, the break away load in the intermediate stage, which is the load that is applied when the bracket 12*d* on the column side starts to displace in the forward direction with respect to the bracket 11*f* on the vehicle side, is measured. The measurement of this break away load is performed by measuring the load at the instant that the bracket 12*d* on the column side is pushed or pulled in the forward direction and begins to displace a little in the forward direction, with the bracket 11*f* on the vehicle side being supported such that it does not displace. At the instant that the bracket 12*d* on the column side displaces a little, the force applied to the bracket 12*d* on the column side is released, so that the bracket 12*d* on the column side does not displace any further than that in the forward direction. As necessary, the bracket 12*d* on the column side can be returned the amount it displaced. In this way, the break away load based on construction (1) and (2) above is measured, however, the pressure applied by the pressure plate section 57 on the bottom side and the pressure plate section 58 on the top side is adjusted so that the break away load in this state is smaller than the proper break away load, which is the suitable break away load required by the steering column support apparatus in the assembled state.

After the break away load for the construction (1) and (2) has been measured, the difference between the break away load in this intermediate stage and the proper break away load is found. After that, the restraining plate 59 and the top plate section 23*b* of the bracket 12*d* on the column side are firmly connected by the bolt 60 and nut 61, which are fastening members, with a strength corresponding to the difference between these loads. This strength can be adjusted based on the measurement value of the break away load for the construction (1) and (2), and the relationship between this tightening torque and the increase in the break away load can be found beforehand through experimentation. Moreover, by manufacturing the restraining plate 59 using an elastic metal plate, there is no large fluctuation in the increase in the break away load even though the value of the tightening torque of the fastening members is a little off from the target value. Therefore, by tightening the bolt 60 and nut 61 with a specified torque, the break away load can be adequately increased, and the proper break away load can be obtained with good precision. In this example, the bolt 60 is located such that it is inserted in the up/down direction though the sliding plate 64 from the side of top plate section 23*b* of the bracket 12*d* on the column side. The nut 61 is screwed onto the portion of the top end section of the bolt 60 that is inserted through the sliding plate 64 that protrudes from the top surface of the restraining plate 59. Therefore, in this example, part of the bracket 11*f* on the vehicle side, the top plate section 70 and bottom plate section 71, which are the pair of sliding plates, and restraining plate 59 are held between the bottom surface of the nut 61 and the top surface of the top plate section 23*b* of the bracket 12*d* on the column side by way of a washer 68.

In the steering column support apparatus of this example, the top plate section 23*b* of the bracket 12*d* on the column side and restraining plate 59 begin to displace in the forward direction with respect to the bracket 11*f* on the vehicle side due to the proper break away load during a secondary collision. Due to this displacement, the energy absorbing member 74 plastically deforms and absorbs impact energy that is transmitted to the bracket 12*d* on the column side from the body of the driver.

The length in the forward/backward direction of the locking notch 56 is long enough so that in the advanced state of a secondary collision, or in other words, in a state wherein the steering column 6 cannot displace any further in the forward direction due to impact energy that is applied to the steering wheel from the body of the driver during a secondary collision, the restraining plate 59 will not come completely out from the locking notch 56. That is, even in a state where the restraining plate 59 has displaced in the forward direction together with the steering column 6 and the bracket 12*d* on the column side during a secondary collision, the dimension in the forward/backward direction of the bracket 11*f* on the vehicle side is sufficiently ensured so that at least the rear end section of the end sections in the width direction of the restraining plate 59 will be located on the top side of the front end section of the bracket 11*f* on the vehicle side, making it possible to prevent the restraining plate 59 from falling down.

In either of the embodiments of the present invention, the tightening torque of the bolt and nut can be adjusted easily, so the bolt and nut are suitable as fastening members. However, as long as the tightening torque can be adjusted easily, other fastening members, such as a rivet, can be used. Furthermore, in the second embodiment, the construction for connecting the bracket on the vehicle side and the bracket on the column side was at only one locating in the center section of the portion between the pair of through holes 26 that are formed at two location on both side in the width direction of the bracket on the vehicle side, however, as long the connection construction is located between the pair of through holes 26, which are for fastening the bracket on the vehicle side to the vehicle body, this construction can be employed at a plurality of locations.

INDUSTRIAL APPLICABILITY

The present invention is not limited to being applied to a steering column support apparatus comprising both a tilt mechanism for adjusting the up/down position of the steering wheel 1, and a telescopic mechanism for similarly adjusting the forward/backward position, but can also be applied to a steering column support apparatus that comprises only a tilt mechanism or only a telescopic mechanism, and furthermore, can also be applied to a fixed steering wheel type steering column support apparatus having neither of these mechanisms.

EXPLANATION OF REFERENCE NUMBERS

1 Steering wheel
2 Steering gear unit
3 Input shaft
4 Tie rod
5, 5a, 5b Steering shaft
6, 6a, 6b, 6c Steering column
7 Universal joint
8 Intermediate shaft
9 Universal joint
10 Housing
11, 11a, 11b, 11c, 11d, 11e, 11f Bracket on the vehicle side
12, 12a, 12b, 12c, 12d Bracket on the column side
13 Bracket on the housing side
14a, 14b Installation plate section
15a, 15b Notch
16a, 16b Sliding plate
17 Energy absorbing member
18 Locking notch
19 Locking capsule
20 Locking groove
21a, 21b Locking hole
22 Locking pins
23, 23a, 23b Top plate section
24 Support plate sections
25 Base plate section
26 Through hole
27, 27a Through hole
28, 28a, 28b Sliding member
29 Bolt
30 Nut
31a, 31b, 31c, 31d, 31e Siding plate section
32 Notch
33a, 33b Connecting section
34 Engaging section
35 Engaging hole
36 Installation holes
37 Head sections
38 Reinforcing plate
39 Auxiliary sliding plates
40 Though hole
41 Wide section
42 Extending section
43a, 43b, 43c, 43d Joining sections
44a, 44b Locking notch
45 Bent section on the bottom side
46 Extending plate section
47 Bent section on the top side
48 Base section
49 Restraining plate section
50 Bent edge section
51 Outside sliding plate
52 Inside sliding plate
53 Through hole
54 Elastic ground tab
55 Spacer
56 Locking notch
57 Pressure plate section on the bottom side
58 Pressure plate section on the top side
59 Restraining plate
60 Bolt
61 Nut
62 Connecting plate section on the bottom side
63 Elastic pressure plate section on the bottom side
64 Sliding plate
65 Notch
66 Connecting plate section on the top side
67 Elastic pressure plate section on the top side
68 Washer
69 Connecting plate section
70 Top plate section
71 Bottom plate section
72 Protruding plate section
73 Bent back section
74 Energy absorbing member
75 Engagement section on the displacement side

What is claimed is:

1. A steering column support apparatus comprises:
a bracket on a vehicle side that is made using metal plate, is fastened to a vehicle body in at least two locations on both sides in the width direction, does not displace in the forward direction during a secondary collision, and has a locking cutout section that extends in the forward/backward direction that is formed in between the two locations on both sides;
a bracket on a column side that is made using metal plate, is located under the bracket on the vehicle side, supports a steering column, and has a top plate section in a top end section that has a width dimension that is greater than the width dimension of the locking cutout section;
a sliding member having a pair of top and bottom sliding plate sections each having a width dimension that is greater than the width dimension of the locking cutout section and arranged such that both end sections in the width direction of these sliding plate sections hold portions of the bracket on the vehicle side located on both sides of the locking cutout section from both the top and bottom sides; and
a fastening member that is inserted in the up/down direction through the sliding member and has a restraining portion on the top end side,
the sliding member and the fastening member being located on a rear end section of the locking cutout section, and by holding portions of the bracket on the vehicle side between the restraining portion and the top plate section by way of the pair of sliding plate sections, the bracket on the column side being supported by the bracket on the vehicle side so as to be able to break away in the forward direction due to an impact load that is applied during a secondary collision.

2. The steering column support apparatus described in claim 1, wherein the pair of sliding plate sections is connected and integrated into a single member by a connecting section having a width dimension that is less than the width dimension of the locking cutout section.

3. The steering column support apparatus described in claim 1, wherein the sliding member comprises:
   an inside sliding member having a pair of sliding plate sections that is connected by a connecting section having a width dimension that is less than the width dimension of the locking cutout section, and through holes in center sections of these sliding plate sections for the fastening member to pass through; and
   an outside sliding member having a pair of sliding plate sections that is connected by a connecting section having a width dimension that is less than the width dimension of the locking cutout section, and notch sections that are open in a center section in the width direction of front end edges of these sliding plate sections for the fastening member to pass through.

4. The steering column support apparatus described in claim 1, wherein the locking cutout section is composed of two though holes or two notches that are parallel with each other and that extend in the forward/backward direction, a sliding member and a fastening member are located in a rear end section of each of these through holes or notches, and the sliding members that are located in these rear end sections are integrated into one member by connecting them together in the width direction by a joining section.

5. The steering column support apparatus described in claim 1, wherein the locking cutout section is composed of two though holes or two notches that are parallel with each other and that extend in the forward/backward direction, a sliding member and a fastening member are located in a rear end section of each of these through holes or notches, a reinforcing plate is provided on top of the sliding members located in the rear end sections that spans between these sliding members, and the restraining portion of the fastening members presses the top surface of this reinforcing plate downward toward the bracket on the vehicle side.

6. The steering column support apparatus described in claim 1, wherein the locking cutout section is composed of a though hole comprising a wide section located in a front half section and two notch shaped extending sections located in a rear half section that are parallel to each other and extend in the forward/backward direction, and a sliding member and a fastening member are located in a rear end section of each of these extending sections.

7. The steering column support apparatus described in claim 1, wherein the locking cutout section is composed of one through hole or notch that extends in the forward/backward direction, the through hole or notch is formed in a center section between two locations on both sides in the width direction, and the sliding member and the fastening member are located in a rear end section of this through hole or notch.

8. The steering column support apparatus described in claim 1, wherein
   the locking cutout section is composed of one notch or two parallel notches open on a front end edge of the bracket on the vehicle side and that extend in the forward/backward direction, or is composed of a though hole comprising a wide section located in a front half section and two notch shaped extending sections located in a rear half section that are parallel to each other and extend in the forward/backward,
   a bent section on the bottom side that is formed by bending a portion of the bracket on the vehicle side that faces a rear end edge section of the top plate section of the bracket on the column side downward and toward the front such as to have a U shaped cross section, and this bent section on the bottom side wraps around and holds the rear end edge section of the top plate section; and
   a bent section on the top side that is formed by bending a protruding plate section, which comprises a base section that extends in the forward direction from a front end edge section of the top plate section and has a width dimension that is less than the width dimension of the one notch or the two notches, and a restraining plate section that is located on a tip end section of the base section and that has a width dimension that is greater than the width dimension of the one notch or the two notches, upward and toward the rear such as to have a U-shaped cross section, and this bent section on the top side restrains portions of the bracket on the vehicle side located on both sides of the one notch or two notches or the through hole.

9. The steering column support apparatus described in claim 1, wherein a spacer having a thickness dimension that is equal to or greater than a thickness dimension of the metal plate of the bracket on the vehicle side is placed inside the locking cutout section and held between the pair of top and bottom sliding plate sections.

10. The steering column support apparatus described in claim 1, wherein
    (1) a pressure plate section on the bottom side is formed in at least a center section in the width direction of a rear end edge of the locking cutout section of the bracket on the vehicle side by bending a tip end edge thereof downward and toward the front, and the pressure plate section on the bottom side pushes a bottom surface of a center section in the width direction of a top plate section of the bracket on the column side upward such that a top surface of the top plate section is pressed against the bottom surface of the bracket on the vehicle side; and/or
    (2) a pressure plate section on the top side is formed in a center section in the width direction of a portion of the top plate section other than a front section by bending a tip end edge thereof upward and toward the rear, and the pressure plate section on the top side pushes the top surface of a center section in the width direction of the bracket on the vehicle side downward such that the bottom surface of the bracket on the vehicle side is pressed against the top surface of the top plate section; and
    (3) a restraining plate is provided on the top surface of the bracket on the vehicle side that spans between portions on both sides of the locking cutout section, and a restraining plate section and the top plate section are connected with the fastening member, such that the portions of the bracket on the vehicle side that are located on both sides of the locking cutout section are held between the restraining plate and the top plate section.

11. The steering column support apparatus described in claim 1, wherein the sliding member is formed by bending a thin metal plate covered on one side with a coating layer made of a low-friction material such that the coating layer is on at least a top surface of the top sliding plate section and a bottom surface of the bottom sliding plate section, and with a bent back section formed with a portion of the bottom sliding plate section that is above a pressure plate section on the bottom side tightly bent at 180 degrees such that a surface that is not covered with the coating layer is on the inside, such that the coating layer on the top surface of the top sliding plate section comes in contact with bottom surfaces of both left and right ends of a restraining plate and a bottom surface of a pressure plate section on the top side, the coating layer on the bottom surface of the bottom sliding plate section comes in contact with a top surface of the top plate section of the bracket on the column side, and the coating layer on both surfaces of the bent back section comes in contact with a bottom surface of the bracket on the column side and a top surface of a pressure plate section on the bottom side.

12. The steering column support apparatus described in claim 1, wherein the length in the forward/backward direction of the locking cutout section is longer than the length in the forward/backward direction of the bracket on the column side and is long enough so that even when a restraining plate, together with the steering column and the bracket on the column side, has displaced all the way possible in the forward direction during a secondary collision, at least part of that restraining plate is located on the top side of a front end section of the bracket on the vehicle side, preventing the restraining plate from dropping down.

13. The steering column support apparatus described in claim 1, wherein an energy absorbing member, which absorbs an impact load by plastically deforming, is provided between the steering column or a portion that displaces in the forward direction together with the steering column and the bracket on the vehicle side or a portion that is supported by the vehicle body or the vehicle side.

* * * * *